(12) United States Patent
Shimizu

(10) Patent No.: US 9,478,061 B2
(45) Date of Patent: Oct. 25, 2016

(54) IMAGE PROCESSING APPARATUS AND METHOD THAT SYNTHESIZES AN ALL-ROUND IMAGE OF A VEHICLE'S SURROUNDINGS

(71) Applicant: FUJITSU LIMITED, Kawasaki-shi, Kanagawa (JP)

(72) Inventor: Seiya Shimizu, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 338 days.

(21) Appl. No.: 14/022,631

(22) Filed: Sep. 10, 2013

(65) Prior Publication Data

US 2014/0118341 A1    May 1, 2014

(30) Foreign Application Priority Data

Oct. 25, 2012 (JP) .................. 2012-235653

(51) Int. Cl.
*G06T 15/00* (2011.01)
*G06T 3/40* (2006.01)

(52) U.S. Cl.
CPC ............. *G06T 15/00* (2013.01); *G06T 3/4038* (2013.01)

(58) Field of Classification Search
CPC .............................. G06T 15/00; G06T 3/4038
USPC ................................................. 348/148, 153
See application file for complete search history.

(56) References Cited

U.S. PATENT DOCUMENTS

| 5,410,346 | A * | 4/1995 | Saneyoshi | B60R 1/00 |
| | | | | 348/116 |
| 7,161,616 | B1 * | 1/2007 | Okamoto | B60R 1/00 |
| | | | | 348/148 |
| 7,304,651 | B2 * | 12/2007 | Ishida | B60R 1/00 |
| | | | | 340/461 |
| 7,307,655 | B1 | 12/2007 | Okamoto et al. | |
| 2010/0134325 | A1 * | 6/2010 | Gomi | B60R 1/00 |
| | | | | 348/148 |
| 2013/0155241 | A1 * | 6/2013 | Tanuki | B60R 1/00 |
| | | | | 348/148 |

FOREIGN PATENT DOCUMENTS

| EP | 1462762 | 9/2004 |
| JP | 2004-297808 | 10/2004 |
| JP | 2006-327498 | 12/2006 |
| JP | 2010-109451 | 5/2010 |
| JP | 2011-155393 | 8/2011 |
| WO | WO00/07373 | 2/2000 |
| WO | WO2012/017560 | 2/2012 |

OTHER PUBLICATIONS

JPOA—Office Action of Japanese Patent Application No. 2012-235653 dated May 10, 2016, with partial English translation.

* cited by examiner

*Primary Examiner* — Francis G Geroleo
(74) *Attorney, Agent, or Firm* — Fujitsu Patent Center

(57) ABSTRACT

An image processing apparatus synthesize a synthesized image by taking pixel values of pixels in a synthesized image corresponding to each point on the three dimensional projection plane as viewed from a specific viewpoint position, as pixel values of corresponding pixels of the first image based on the first correspondence relationship, and taking pixel values of each pixel in the synthesized image corresponding to pixels identified in the first image as being pixels representing a solid object, as pixel values of corresponding pixels of the second image based on the second correspondence relationship.

12 Claims, 24 Drawing Sheets

FIG.9

| POLYGON ID | APEX POINT ID | POLYGON APEX POINT COORDINATE VALUES | | | TEXTURE COORDINATE VALUES | |
|---|---|---|---|---|---|---|
| | | X | Y | Z | $S_{(T)}$ | $T_{(T)}$ |
| 1 | 1 | $x_1$ | $y_1$ | $z_1$ | $s_{1(T)}$ | $t_{1(T)}$ |
| | 2 | | | | | |
| | 3 | | | | | |
| | 4 | | | | | |
| 2 | 1 | | | | | |
| | 2 | | | | | |
| | 3 | | | | | |
| | 4 | | | | | |
| 3 | 1 | | | | | |
| | 2 | | | | | |
| | 3 | | | | | |
| | 4 | | | | | |
| ⋮ | | | | | | |

VEHICLE COORDINATE SYSTEM

LOCAL IMAGE COORDINATE SYSTEM

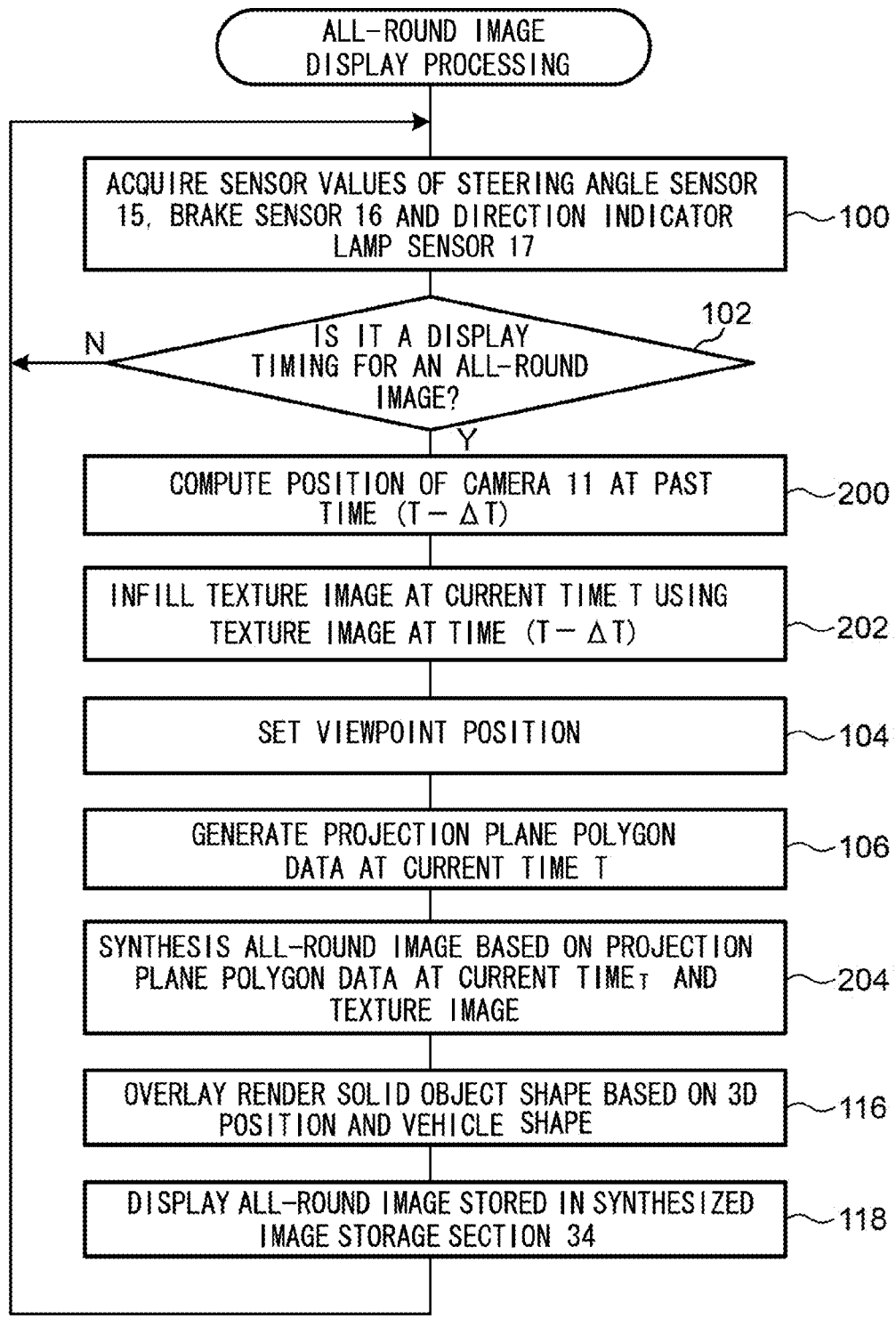

IMAGE PROCESSING APPARATUS AND METHOD THAT SYNTHESIZES AN ALL-ROUND IMAGE OF A VEHICLE'S SURROUNDINGS

CROSS-REFERENCE TO RELATED APPLICATION

This application is based upon and claims the benefit of priority of the prior Japanese Patent Application No. 2012-235653, filed on Oct. 25, 2012, the entire contents of which are incorporated herein by reference.

FIELD

The embodiments discussed herein are related to an image processing apparatus, an image processing method and an image processing program.

BACKGROUND

Technology exists that, by synthesizing (combining) camera images acquired by one or more than one vehicle-mounted camera, creates an all-round image of the vehicle's surroundings in which it is possible to change a virtual viewpoint as desired. Existing all-round image creation methods are capable of displaying a road surface with little distortion. However, subjects with height data relative to the road surface, namely solid objects, are displayed with a large amount of stretching, or displayed with distortion. This is caused by creating and displaying an all-round image that is based on camera images that are project onto a projection plane that has a shape different from the shape of the projection of the solid objects captured by the camera.

Regarding such an issue, technology exists in which environment data of the moving body's surroundings is detected, 3D (three dimensional) environment data is then constructed of the moving body's surroundings based on the detected environment data, and then a display image is generated that renders a camera image onto a projection plane based on the constructed 3D environment data.

RELATED PATENT DOCUMENTS

International Publication Pamphlet No. WO2000/07373
International Publication Pamphlet No. WO2012/017560
Japanese Laid-Open Patent Publication No. 2004-297808

However, when projecting a camera image onto a projection plane based on 3D environment data, this leads to a solid object being rendered onto both a projection plane representing a road surface and also onto a projection plane based on the 3D environment data, and results in a multi-view image of the solid object. It is possible to eliminate such a multi-view image of a solid object by not rendering the solid object image onto the projection plane representing the road surface at positions where the 3D environment data is present. However, the portions where the solid object image was present rendered onto the projection plane representing the road surface are portions that were behind the solid object as viewed from the camera, and so are portions where there is no image data present in the camera images. Pixel values for these portions are accordingly missing, leading to solid object shadow-like regions appearing on a screen.

SUMMARY

According to an aspect of the embodiments, an image processing apparatus includes: a processor; and a memory storing instructions, which, when executed by the processor, perform a procedure, the procedure including: (a) acquiring image data representing successively captured images of a moving body's surroundings, and acquiring 3D position data representing 3D positions of plural points on a solid object present in the moving body's surroundings as expressed in a moving body coordinate system set for the moving body; (b) calculating a movement amount that the moving body has moved during an interval from a first time to a second time; (c) identifying pixels representing a solid object in a first image captured at the first time based on the 3D position data acquired by (a); (d) creating, by virtual viewpoint projection, a first correspondence relationship indicating correspondence between each point on a three dimensional projection plane determined so as to contain the moving body therein at the first time and positions of each pixel of the first image, and, based on the movement amount calculated by (b), creating, by virtual viewpoint projection, a second correspondence relationship indicating correspondence between each point on the three dimensional projection plane and positions of each pixel in a second image captured at the second time by expressing the position of the moving body at the second time in the moving body coordinate system at the first time; and (e) synthesizing a synthesized image by taking pixel values of pixels in a synthesized image corresponding to each point on the three dimensional projection plane as viewed from a specific viewpoint position, as pixel values of corresponding pixels of the first image based on the first correspondence relationship, and taking pixel values of each pixel in the synthesized image corresponding to pixels identified by (c) in the first image as being pixels representing a solid object, as pixel values of corresponding pixels of the second image based on the second correspondence relationship.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a table illustrating an example of projection plane polygon data contents;

FIG. 29 is a flow chart illustrating all-round image display processing in the second exemplary embodiment.

DESCRIPTION OF EMBODIMENTS

A detailed explanation follows regarding an example of an exemplary embodiment of technology disclosed herein, with reference to the drawings. In the present exemplary embodiment a case is explained in which technology disclosed herein is applied to an image processing apparatus that synthesizes an all-round image of a vehicle's surroundings.

First Exemplary Embodiment

Figure 1:
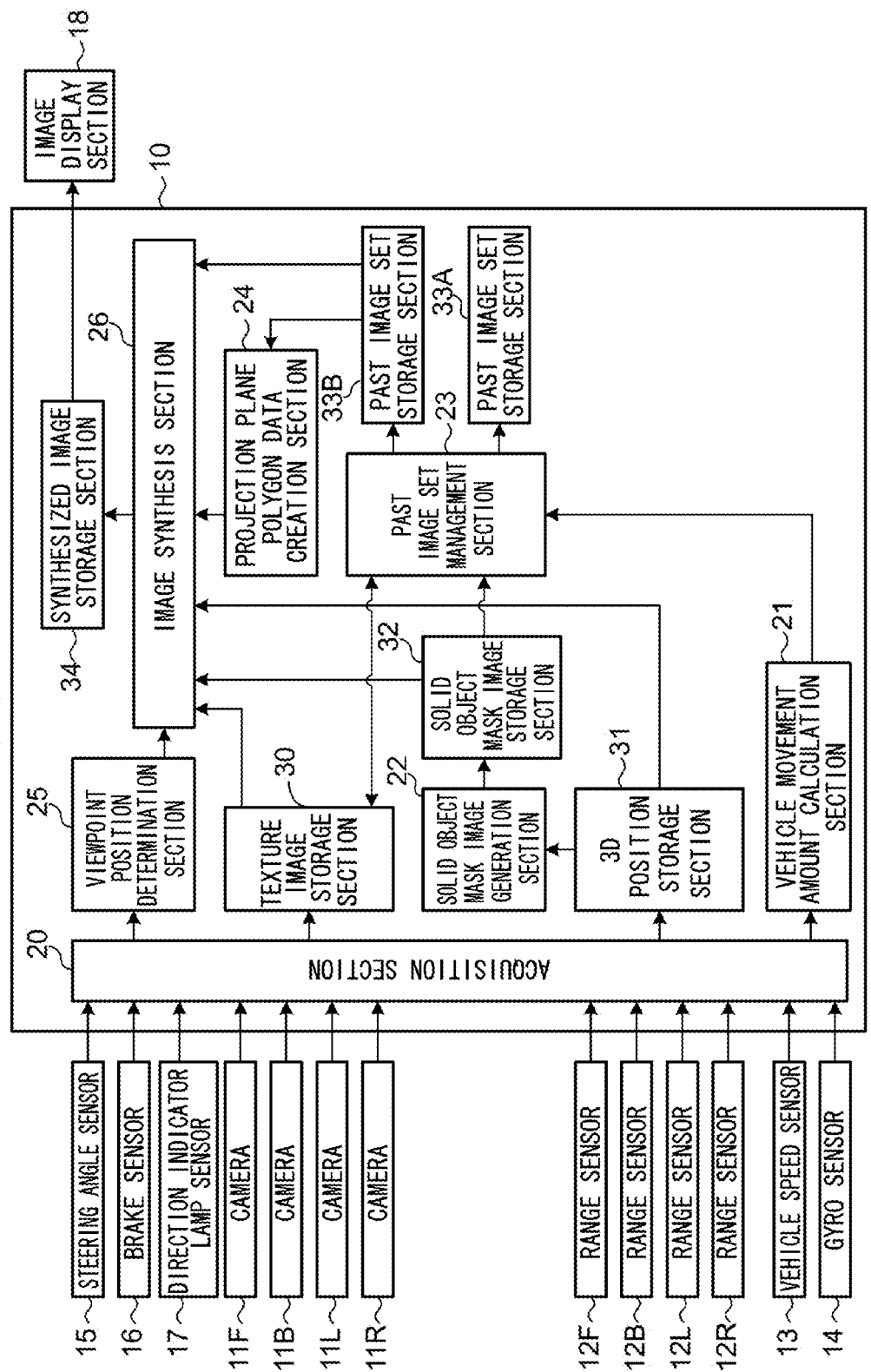
FIG. 1 is a functional block diagram illustrating an example of an image processing apparatus according to a first exemplary embodiment.

An image processing apparatus 10 according to a first exemplary embodiment is illustrated in FIG. 1. The image processing apparatus 10 synthesizes a natural all-round image by allocating for pixel value missing portions arising from the presence of solid objects, the pixel values of corresponding positions in an image that was previously captured at a position different from the current position.

As illustrated in FIG. 1, the image processing apparatus 10 is connected to cameras 11F, 11B, 11L, 11R, range sensors 12F, 12B, 12L, 12R, a vehicle speed sensor 13, a gyro sensor 14, a steering angle sensor 15, a brake sensor 16 and a direction indicator lamp sensor 17.

Figure 2:
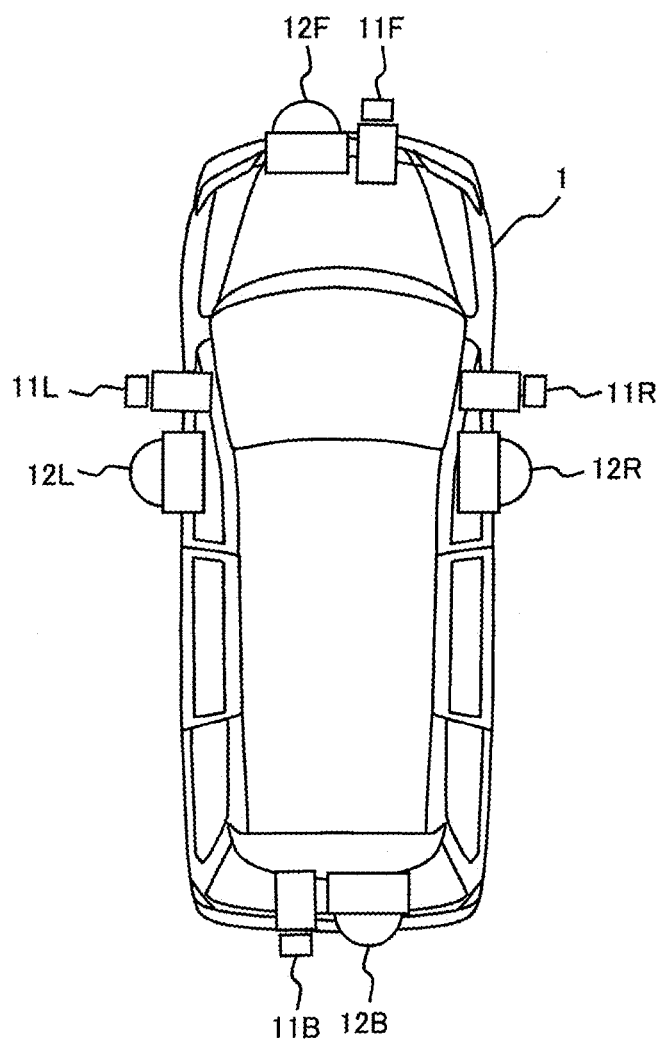
FIG. 2 is a schematic diagram illustrating an example of a placement of cameras and range sensors.

An example of a placement of the cameras 11F, 11B, 11L, 11R and the range sensors 12F, 12B, 12L, 12R is illustrated in FIG. 2. In FIG. 2, a vehicle 1 is a vehicle installed with the image processing apparatus 10. As illustrated in FIG. 2, the camera 11F and the range sensor 12F are mounted to the front of the vehicle 1. The camera 11B and the range sensor 12B are mounted to the back of the vehicle 1. The camera 11L and the range sensor 12L are mounted on the left side of the vehicle 1. The camera 11R and the range sensor 12R are mounted to the right side of the vehicle 1.

The cameras 11F, 11B, 11L, 11R are, for example, cameras with wide angle lenses such as fisheye lenses covering horizontal direction angles of view of 180° or greater. Each of the cameras 11F, 11B, 11L, 11R is positioned with a partially overlapping field of view so as to enable image capture over a 360° range around the vehicle. Each of the cameras 11F, 11B, 11L, 11R captures an image of an image capture range at a frequency of, for example, 30 frames/second (fps), and outputs the captured image data to the image processing apparatus 10. Note that in the following, reference is simply made to "cameras 11" when no discrimination between the cameras is made in the explanation.

The range sensors 12F, 12B, 12L, 12R are distance sensors that measure the distance from the respective range sensor to target objects. An example of a range sensor that may be employed as the range sensor 12F, 12B, 12L, 12R is a laser scanner that emits an infrared laser pulse, receives the laser pulse returning after it has been reflected by a target object, and converts time-of-flight (TOF) from emission to reception into a distance. FIG. 2 illustrates an example of placement employing 4 range sensors that perform two-dimensional laser scanning with horizontal and vertical detection angles of about 150°. The 4 range sensors 12F, 12B, 12L, 12R are placed with overlapping respective detection ranges so as to be capable of measuring distance data to objects present over a 360° range around the vehicle. Each of the range sensors 12F, 12B, 12L, 12R measures, for example, the vehicle's surroundings at 30 fps, and outputs measured distance data and the laser pulse emission angles to the image processing apparatus 10. Note that in the following, reference is simply made to "range sensors 12" when no discrimination is made between the range sensors in the explanation.

The image capture timings for camera images by the cameras 11 and the measurement timings of distance data by the range sensors 12 are synchronized.

The vehicle speed sensor 13 is a sensor that detects the speed of the vehicle 1. The gyro sensor 14 is a sensor that detects the yaw rate of the vehicle 1. The steering angle sensor 15 is a sensor that detects the steering angle of the steering. The brake sensor 16 is a sensor that detects a travel amount of the brake pedal. The direction indicator lamp sensor 17 is a sensor that detects the operation state of the direction indicator lamps. Each of the sensors outputs the respective detected sensor values to the image processing apparatus 10.

An image display section 18 is a display device such as a display that displays an all-round image synthesized by the image processing apparatus 10. Note that the image display section 18 may be configured to include an input device such as a touch panel, so as to implement a pointing device function.

The image processing apparatus 10 also includes an acquisition section 20, a vehicle movement amount calculation section 21, a solid object mask image generation section 22, a past image set management section 23, a projection plane polygon data creation section 24, a viewpoint position determination section 25 and an image synthesis section 26. The image processing apparatus 10 also includes a texture image storage section 30, a 3D position storage section 31, a solid object mask image storage section 32, past image set storage sections 33A, 33B and a synthesized image storage section 34. Note that the acquisition section 20 serves as an example of (a) of technology disclosed herein. The vehicle movement amount calculation section 21 serves as an example of (b) of technology disclosed herein. The solid object mask image generation section 22 serves as an example of (c) of technology disclosed herein. The past image set management section 23 serves as an example of (i) of technology disclosed herein. The projection plane polygon data creation section 24 serves as an example of (d) of technology disclosed herein. The image synthesis section 26 serves as an example of (e) of technology disclosed herein.

The acquisition section 20 acquires sensor values that have been output from the vehicle speed sensor 13 and the gyro sensor 14, and outputs these to the vehicle movement amount calculation section 21.

Figure 3:
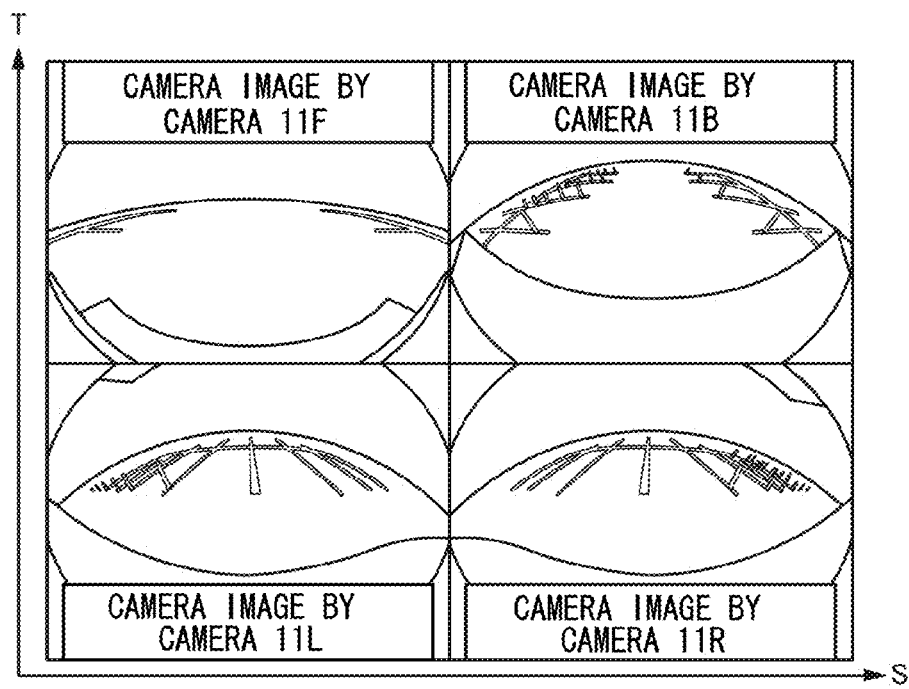
FIG. 3 is a sketch diagram illustrating an example of a texture image.

The acquisition section 20 acquires the respective camera images captured by each of the cameras 11, constructs a texture image using each of the acquired camera images, associates each of the camera images with its respective capture time, and then stores these in the texture image storage section 30. An example of a texture image is illustrated in FIG. 3. In the example illustrated in FIG. 3, 1 frame image is segmented into 4, and a texture image is constructed by allocating camera images captured by the respective cameras 11F, 11B, 11L, 11R to each of the segment regions. Moreover, S and T in FIG. 3 are respective axes of an image coordinate system of the texture image (texture image coordinate system), with the coordinates of pixels in the texture image coordinate system (texture coordinate values) denoted by (S, T). Note that examples of construction of a texture image are not limited to the 4 segments as illustrated in FIG. 3. The correspondence relationship between the texture image coordinate system and the coordinate systems of each of the respective camera images (local image coordinate system) is predetermined according to such factors as how the texture image is constructed using the respective camera images.

Figure 4:
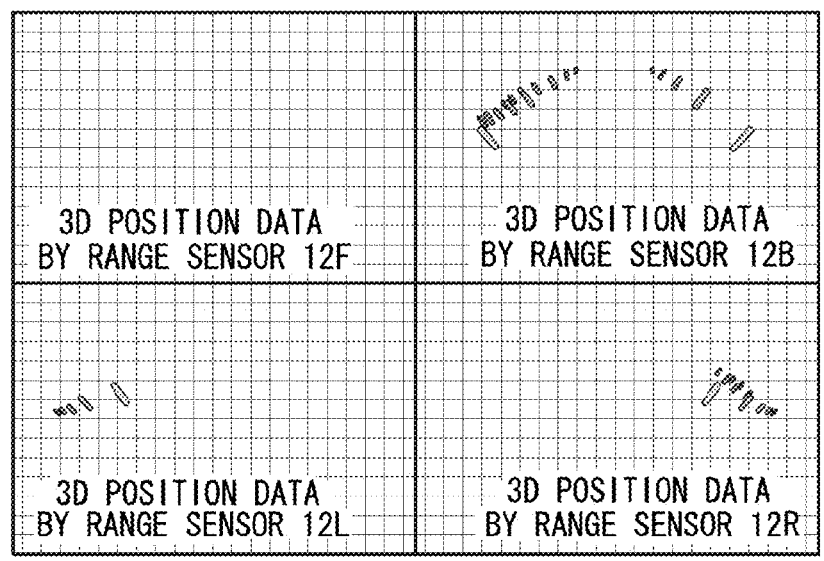
FIG. 4 is a sketch diagram illustrating an example in which distance data has been associated with camera images and converted into an image.

Moreover, the acquisition section 20 acquires distance data measured by the respective range sensors 12 and their corresponding laser pulse emission angles, and computes 3D positions in the vehicle coordinate system of plural measurement points on a solid object from which the laser pulse has been reflected. 3D position data representing the 3D positions of each of the computed measurement points and measurement times of the distance data are then associated with each other and stored in the 3D position storage section 31. Due to the camera image capture times and the distance data measurement times being synchronized with each other, the times associated with the texture image stored in the texture image storage section 30 and associated with the 3D position data stored in the 3D position storage section 31 are the same times as each other. FIG. 4 illustrates an example in which 3D position data has been associated with camera images and converted into an image. In the example illustrated in FIG. 4 the three dimensional positions of measurement points that correspond to the road surface have been removed. Removal of the measurement points of the road surface can be simply performed by removing any measurement points out of the computed measurement points at a three dimensional position in the vehicle coordinate system having a Z coordinate (height data) within a fixed threshold value (say ±30 mm). Moreover, in the example illustrated in FIG. 4, the measurement points are illustrated with a denser coloration the further the distance from the vehicle 1 in the Y axis direction of the vehicle coordinate system.

Note that the vehicle coordinate system is a coordinate system set for the vehicle 1. For example, it may be set as a coordinate system having a Y axis as the direction of travel of the vehicle 1, a Z axis as the vertical direction of the vehicle 1, and an X axis as the horizontal direction that configures a right hand coordinate system with the Y and Z axes, with an origin at the point the road surface flat plane intersects with a normal from the center of the vehicle 1 to the road surface flat plane. The coordinates of each of the points of the vehicle coordinate system are expressed by (X, Y, Z).

The acquisition section 20 also acquires each of the sensor values detected with the steering angle sensor 15, the brake sensor 16 and the direction indicator lamp sensor 17, and outputs these to the viewpoint position determination section 25.

Figure 5:
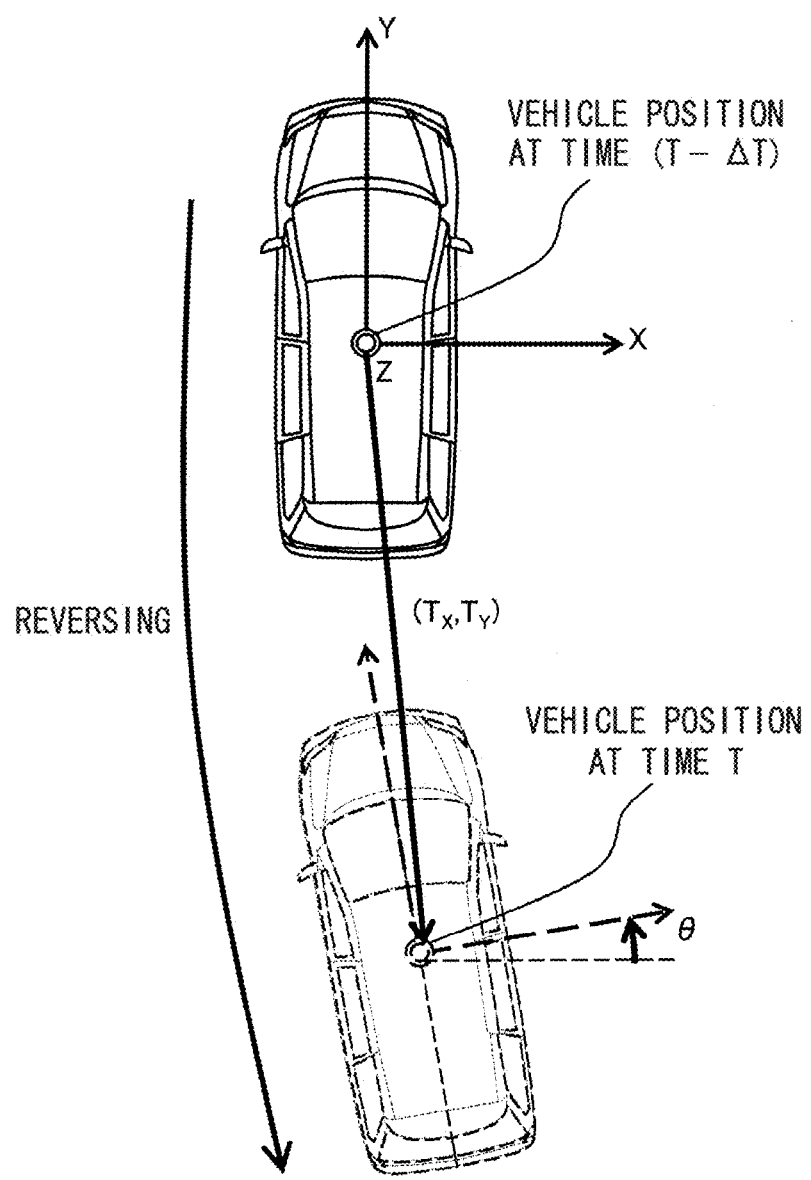
FIG. 5 is a schematic diagram illustrating a vehicle movement amount in an interval $\Delta T$.

The vehicle movement amount calculation section 21 successively measures the movement amount of the vehicle 1 based on the sensor values of the vehicle speed sensor 13 and the gyro sensor 14 acquired by the acquisition section 20. Consider, for example, a case in which the vehicle 1 has moved as illustrated in FIG. 5 in the interval between a time (T−ΔT) and the current time T. X, Y and Z in FIG. 5 indicate the respective axes of the vehicle coordinate system. Based on the vehicle speed and yaw rate that are the sensor values of the vehicle speed sensor 13 and the gyro sensor 14, the vehicle movement amount calculation section 21 computes a translation movement amount $(T_X, T_Y)$ of the vehicle 1 in the interval ΔT, and a rotational movement amount θ with respect to yaw (rotational movement about the Z axis) of the vehicle 1 in the interval ΔT. Combining the translation movement amount and the rotational movement amount gives the movement amount $(T_X, T_Y, θ)$ of the vehicle 1 in the interval ΔT.

ΔT is a movement time taken by the vehicle 1 to move a sufficient distance to capture pixel value missing portions arising from the presence of solid objects, namely to capture behind the solid object, and is variable. For example, when the vehicle 1 reverses at a speed of 6 km/hour, a movement distance sufficient to capture an image of the missing portions is 1 m, giving ΔT=0.6 seconds.

Note that the movement amount of the vehicle 1 may, for example, be computed from rotation angles of the wheels and steering angles, or may be computed from the change in position of the vehicle itself as measured by a Global Positioning System (GPS) terminal. The movement amount of the vehicle 1 may also be computed based on changes in distance from the vehicle 1 to peripheral objects as measured by the range sensors 12.

Figure 6:
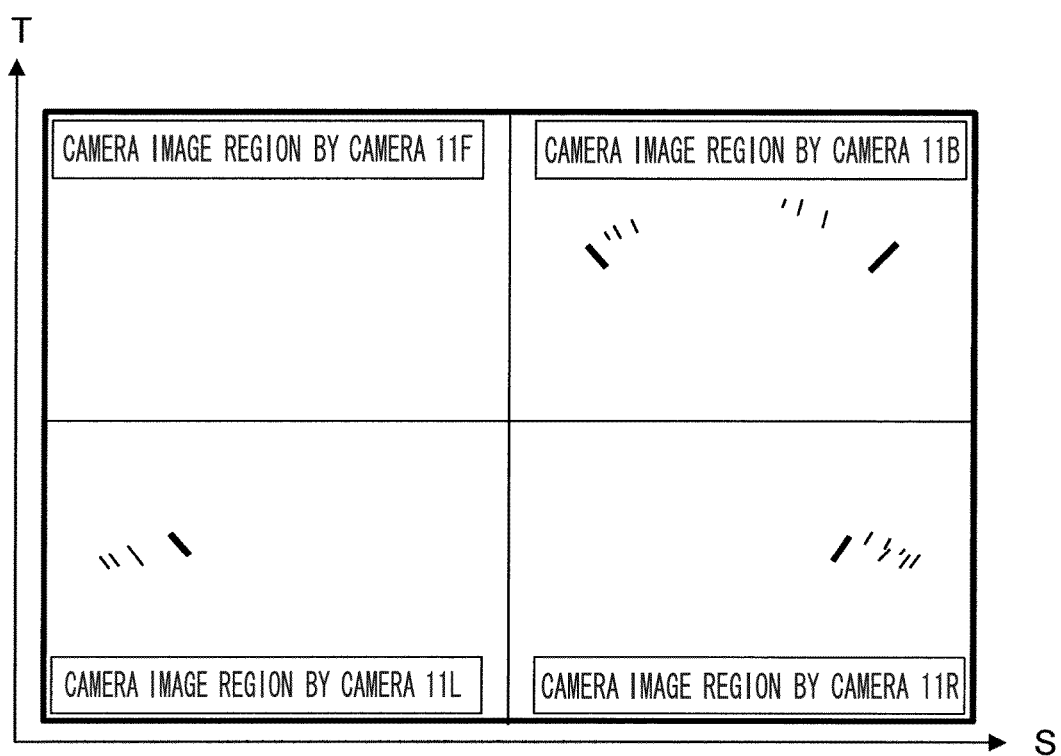
FIG. 6 is a sketch diagram illustrating example of a solid object mask image.

Based on 3D position data stored in the 3D position storage section 31, the solid object mask image generation section 22 generates a solid object mask image to identify pixels representing solid objects in the texture image. An example of such a solid object mask image is illustrated in FIG. 6. Pixels having a mask value (pixel value) of 1 in the solid object mask image (the black portions in FIG. 6) indicate that the pixel of the texture image corresponding to the pixel position is a pixel representing a solid object. However, pixels having a mask value of 0 (the white portions in FIG. 6) indicate that the pixel of the texture image corresponding to the pixel position is not a pixel representing a solid object.

Determination as to whether or not the pixels of the texture image are pixels representing a solid object can be achieved by obtaining incident light vectors from the three dimensional positions of each of the measurement points towards the cameras 11, based on the 3D position data of each of the measurement points, and referring to a function or a table expressing the relationship between incident light vectors and the position of each of the pixels in the respective camera images. The solid object mask image generation section 22 associates, as the generation time in the generated solid object mask image, the same time as the measurement time associated with the 3D position data, and stores these in the solid object mask image storage section 32.

The past image set management section 23 manages saving or discarding of past images sets according to the movement amount of the vehicle 1. The past image set means a texture image, constructed with camera images captured at a past time at a vehicle 1 position that is different to the current position, and a solid object mask image generated at the corresponding past time. The reason this is done is so that it is always possible to refer to a texture image that has been constructed with camera images captured from a position at a constant distance separated from the current vehicle position (for example a position 1 m to 2 m in front of or behind) and to the corresponding solid object mask image.

Explanation follows regarding an example of execution of management to save or discard past image sets. The past image set storage sections 33A, 33B are provided in the image processing apparatus 10 to store the past image sets. When the vehicle is moving forwards (or reversing) the past image set management section 23 stores a past image set from a position 0 to 1 m behind (or in front of) the current vehicle position in the past image set storage section 33A. The past image set management section 23 also stores a past image set from a position 1 to 2 m behind (or in front of) the current vehicle position in the past image set storage section 33B. The past image set management section 23 discards the past image set stored in the past image set storage section 33B at the point in time when the image capture position of the camera images employed to construct the texture image stored in the past image set storage section 33B reaches 2 m behind (or in front of) the current image capture position. At the same time, the past image set management section 23 also moves the past image set stored in the past image set storage section 33A into the past image set storage section 33B. Moreover, the texture image stored in the texture image storage section 30 and the solid object mask image stored in the solid object mask image storage section 32 are copied into the past image set storage section 33A. There is consequently always a texture image constructed with camera images captured at a position separated by 1 to 2 m from the current position and a corresponding solid object mask image stored in the past image set storage section 33B.

Moreover, the past image set management section 23 also manages the distance between the current position of the vehicle 1 and the image capture position of the camera images for constructing the texture images to be contained in the past image sets based on the movement amount ($T_X$, $T_Y$, $\theta$) calculated by the vehicle movement amount calculation section 21. The movement amount of the vehicle 1 in the interval ($\Delta T_A$) between the time (T−$\Delta T_A$) associated with the past image set stored in the past image set storage section 33A and the current time T is denoted ($T_{AX}$, $T_{AY}$, $\theta_A$).

Similarly, the movement amount of the vehicle 1 in the interval ($\Delta T_B$) between the time (T−$\Delta T_B$) associated with the past image set stored in the past image set storage section 33B and the current time T is denoted ($T_{BX}$, $T_{BY}$, $\theta_B$). Note that the times associated with the past image sets are the image capture times that were associated when the respective texture image contained in the past image set was stored in the texture image storage section 30.

In the example described above, the past image set management section 23 manages the past image sets stored in the past image set storage sections 33A, 33B by monitoring the value of |$T_{BY}$|. Note however that although an example has been explained in which the value of |$T_{BY}$| is monitored to manage storage of past image sets based on movement distance to behind (or in front of) the vehicle 1, determination may be made by employing the movement amount ($T_X$, $T_Y$, $\theta$) holistically.

The projection plane polygon data creation section 24 creates projection plane polygon data at current time T for synthesizing a three dimensional all-round image expressing the whole of the periphery of the vehicle 1 from a texture image constructed from the respective camera images captured by each of the cameras 11.

Figure 7:
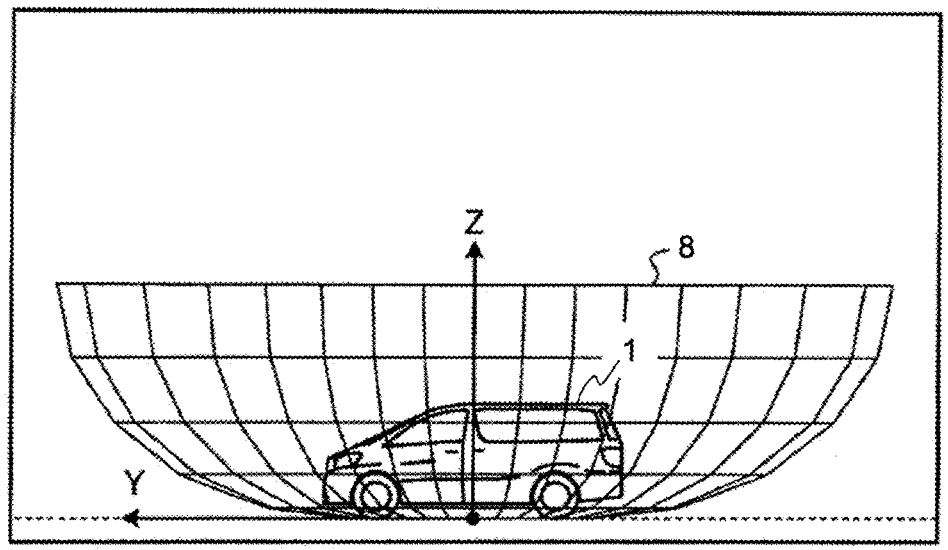
FIG. 7 is a schematic side view to explain a three dimensional projection plane.
Figure 8:
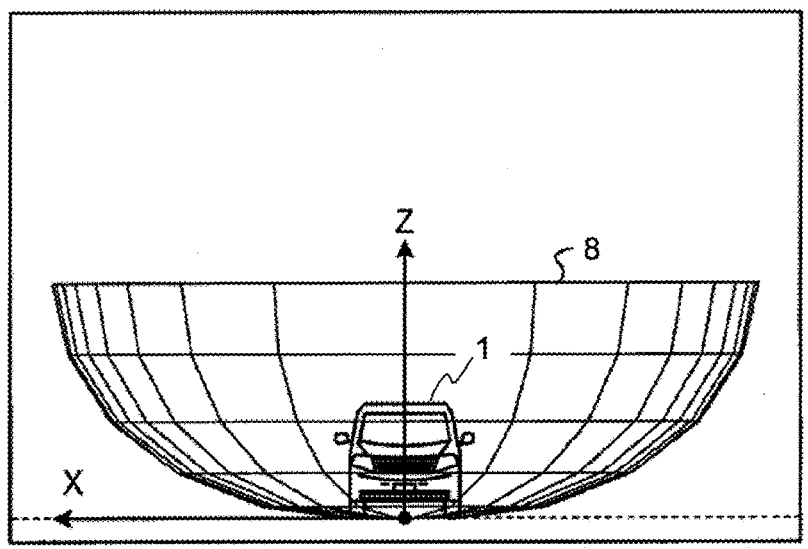
FIG. 8 is a schematic front view to explain a three dimensional projection plane.

First, a three dimensional projection plane 8 is set for projecting a texture image so as to contain the vehicle 1 therein at the current time T. FIG. 7 and FIG. 8 illustrate an example of a shape of the three dimensional projection plane 8. FIG. 7 illustrates the shape of the three dimensional projection plane 8 as viewed from the left hand side of the vehicle 1, and FIG. 8 illustrates the shape of the three dimensional projection plane 8 as viewed from the front of the vehicle 1. The three dimensional projection plane 8 may be represented as a three dimensional plane having a shape with the vehicle 1 positioned at the center, the road surface approximated to a flat plane in the vicinity of the vehicle 1, and having increasing gradient with distance from the vehicle 1.

The shape of the three dimensional projection plane 8 is derived by approximating a curve to predetermined flat planes, and is stored as 3D polygon data in a specific storage region. For example, the three dimensional projection plane 8 can be configured by defining 4 apex points for each polygon and then forming quadrangular polygons by connecting together the 4 apex points. A polygon ID is appended to each polygon configuring the three dimensional projection plane 8, and an apex point ID is appended to apex points configuring each of the polygons. The polygon ID is data to uniquely identify each polygon, and the apex point ID is data to uniquely identify each apex point of the polygon. Note that although explanation follows regarding a case in which each polygon is quadrangular shaped, there is no limitation to the shape of each polygon being a quadrangular shape, and another polygonal shape may be employed therefor.

The projection plane polygon data creation section 24 creates projection plane polygon data at a time T, in which the polygon apex point coordinate values (X, Y, Z) in the vehicle coordinate system for each of the apex points of the above 3D polygon data are corresponded with texture coordinate values ($S_{(T)}$, $T_{(T)}$) of the texture image at time T. An example of projection plane polygon data at time T is illustrated in FIG. 9. The correspondence between the polygon apex point coordinate values (X, Y, Z) and the texture coordinate values ($S_{(T)}$, $T_{(T)}$) is computed by virtual viewpoint projection based on the mounting position and mounting angle of each of the cameras 11.

Figure 10:
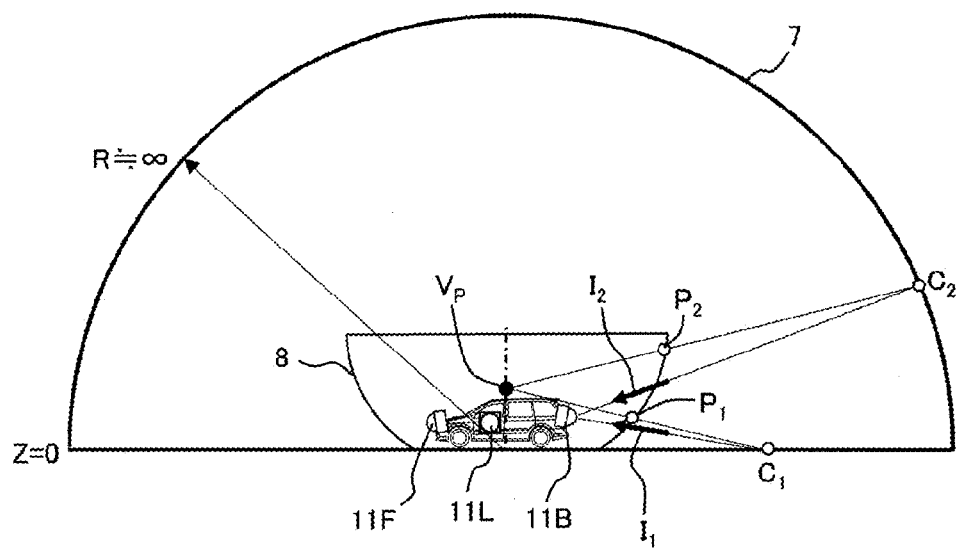
FIG. 10 is a schematic diagram to explain a virtual viewpoint projection.

In a virtual viewpoint projection, as illustrated in FIG. 10, points on the three dimensional projection plane 8 are projected onto a virtual viewpoint projection plane 7 with reference to a virtual viewpoint position Vp. The virtual viewpoint projection plane 7 is a projection plane with a shape that has a range with an Z axis in the vehicle coordinate system of 0 or greater, that is the combination of a hemisphere having a radius R of sufficiently large distance (infinite radius) with a center at the origin of the vehicle coordinate system, combined with a road surface flat plane. In FIG. 10, a point $P_1$ is projected to $C_1$, and a point $P_2$ is projected to $C_2$. Incident light vectors $I_1$, $I_2$ to the respective cameras 11 in the vehicle coordinate system from the points $C_1$, $C_2$ that have been projected onto the virtual viewpoint projection plane 7 are converted into incident vectors in the local image coordinate system for each of the camera images. Moreover, by converting the local image coordinate system into the texture image coordinate system, the polygon apex point coordinate values (X, Y, Z) can be corresponded with the texture coordinate values ($S_{(T)}$, $T_{(T)}$). A more specific creation method using projection plane polygon data is described later for creating projection plane polygon data to be employed in infilling. Note that creation of the projection plane polygon data at the current time T differs from the creation of infill-use projection plane polygon data described later in the point that it does not entail coordinate conversion based on a movement amount in the interval $\Delta T$.

Figure 11:
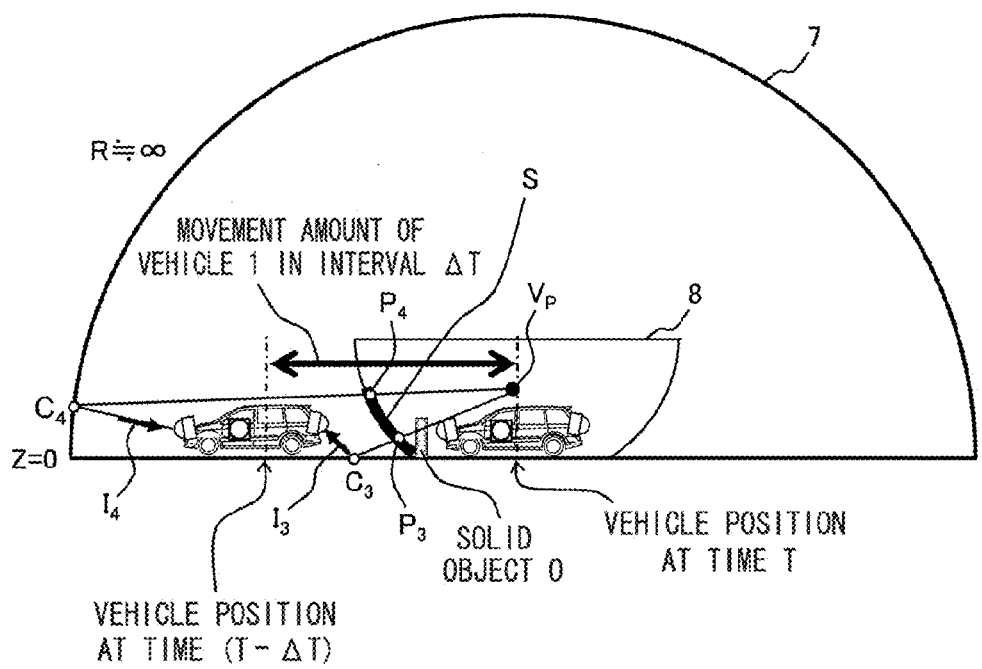
FIG. 11 is a schematic diagram to explain corresponding current and past points in a virtual viewpoint projection.
Figure 12:
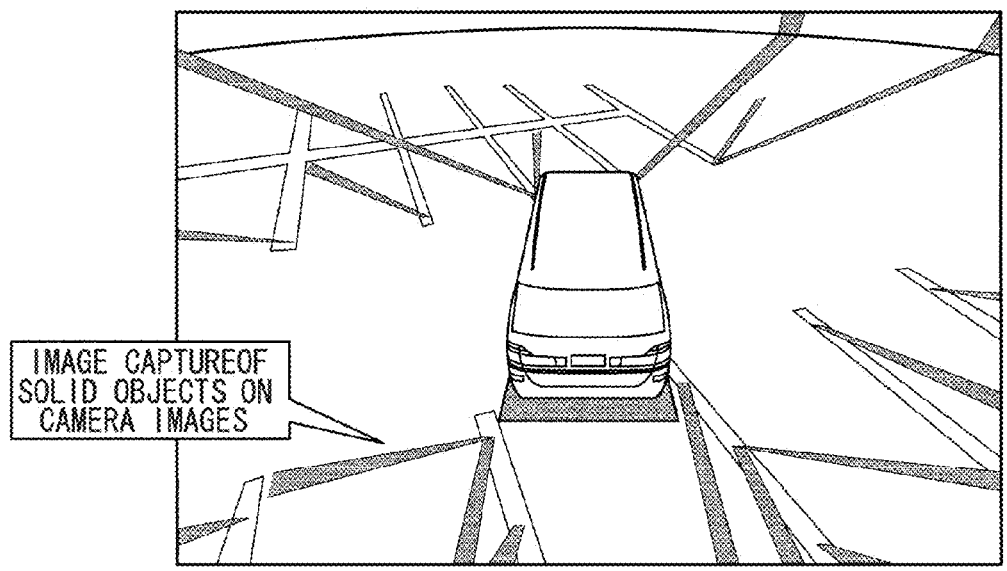
FIG. 12 is a sketch diagram to illustrate an example of a synthesized image in which projected images of solid objects have been greatly stretched.
Figure 13:
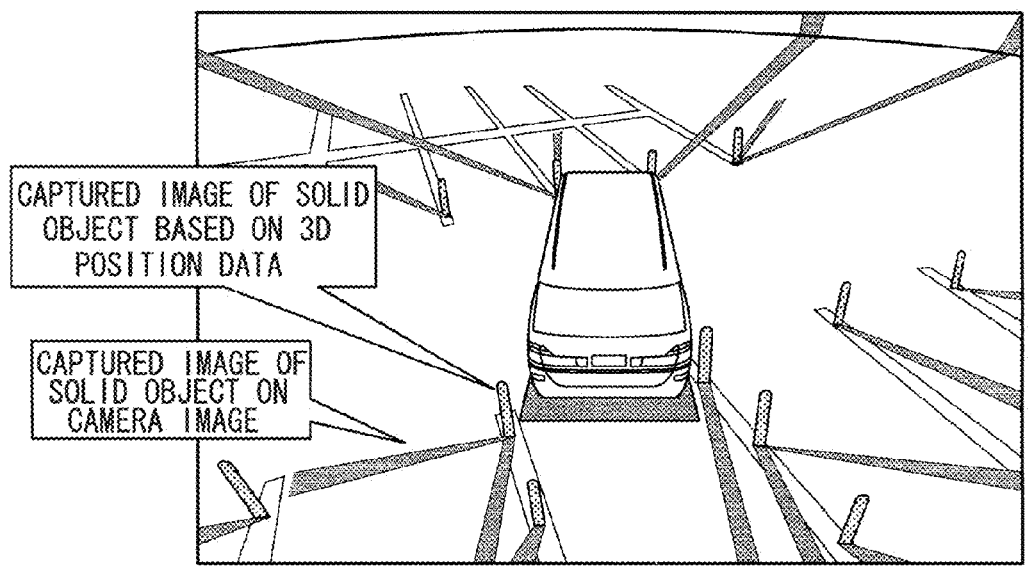
FIG. 13 is a sketch diagram illustrating an example of a synthesized image in which multi-view solid object projection images are present.
Figure 14:
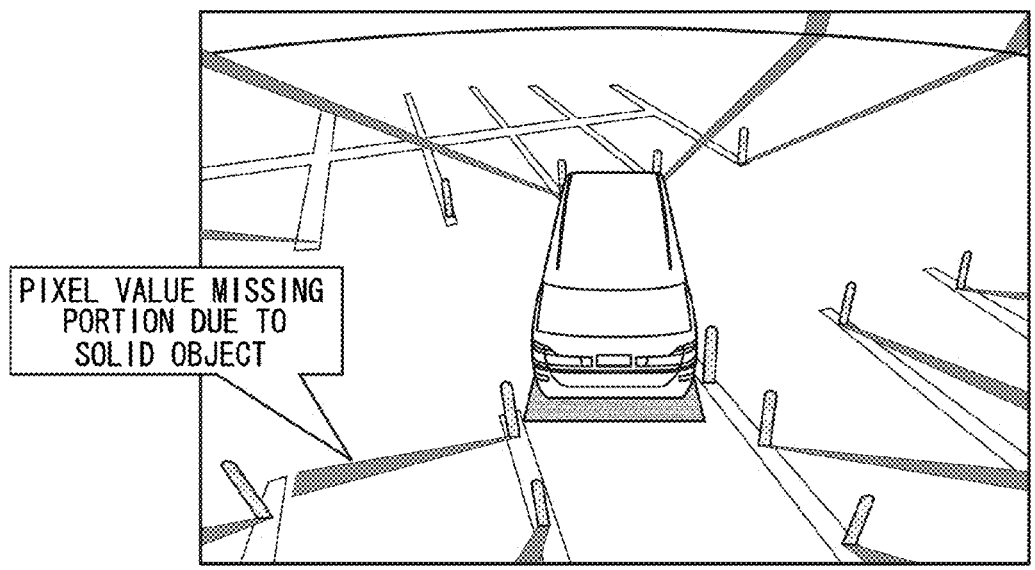
FIG. 14 is a sketch diagram illustrating an example of a synthesized image in which pixel value missing portions arising from the presence of solid objects occur.

A region on the three dimensional projection plane 8 at current time T, corresponding to the solid object O in the camera image captured at current time T, is indicated by S in FIG. 11. When an all-round image is synthesized based on the three dimensional projection plane 8 containing the region S this results in the projected image of the solid object being an image that is greatly stretched or distorted, as illustrated in FIG. 12. Moreover, a partial projection plane for projecting a solid object based on the three dimensional positional data from the measurement results by the range sensors 12 may be created at a different position to that of the three dimensional projection plane 8. However, in such cases, as illustrated in FIG. 13, this results in an image in which both a projected image of a solid object projected onto the three dimensional projection plane 8 and a projected image of a three dimensional projected onto a partial projection plane are present. It is possible to arrange things such that solid objects projected on to partial projection planes are not also projected onto the three dimensional projection plane 8. However, in such cases, since the pixels of the camera image corresponding to the region S of the three dimensional projection plane 8 correspond to positions behind the solid object as viewed from the camera, these pixel values are also missing. Thus, as illustrated in FIG. 14, solid object shadow-like regions appear in the all-round image.

The projection plane polygon data creation section 24 accordingly employs the virtual viewpoint projection described above to create projection plane polygon data for use in infilling. Infill-use projection plane polygon data is projection plane polygon data for projecting a texture image, constructed with camera images captured at a past time (T–$\Delta T$) at a position different to the current position, onto the three dimensional projection plane 8 at the current time T. By using such infill-use projection plane polygon data, the pixel value missing portions arising from the presence of solid objects in an all-round image synthesized using the texture image at the current time T can be in-filled using pixel values of the texture image at past time (T–$\Delta T$). A specific explanation follows regarding creation of infill-use projection plane polygon data.

In FIG. 11, the pixels in the camera images corresponding to points P3, P4 contained in the region S on the three dimensional projection plane 8 that correspond to the solid object O at current time T are pixels of points $C_3$, $C_4$ projected onto the virtual viewpoint projection plane 7. However, in camera images at the current time T, the pixels corresponding to the region S are pixels corresponding to positions behind the solid object O, but there are no pixel values representing positions behind the solid object O. In other words, the pixel values of the pixels corresponding to the region S are pixel values representing the solid object O.

However, it is possible to compute the position of the vehicle 1 and the camera position at time (T–$\Delta T$) from calculation results by the vehicle movement amount calculation section 21, as explained below. First, the road surface is approximated to a flat plane and the pitch of vehicle motion (rotational motion about the X axis) and the roll (rotational motion about the Y axis) are ignored, and then a 4×4 coordinate conversion matrix $M_{\Delta T}$ is defined as illustrated in Equation (1) below by employing a movement amount ($T_X$, $T_Y$, $\theta$) of the vehicle 1 over the interval $\Delta T$.

$$M_{\Delta T} = \begin{bmatrix} \cos\theta & -\sin\theta & 0 & T_X \\ \sin\theta & \cos\theta & 0 & T_Y \\ 0 & 0 & 1 & 0 \\ 0 & 0 & 0 & 1 \end{bmatrix} \quad (1)$$

Figure 15:
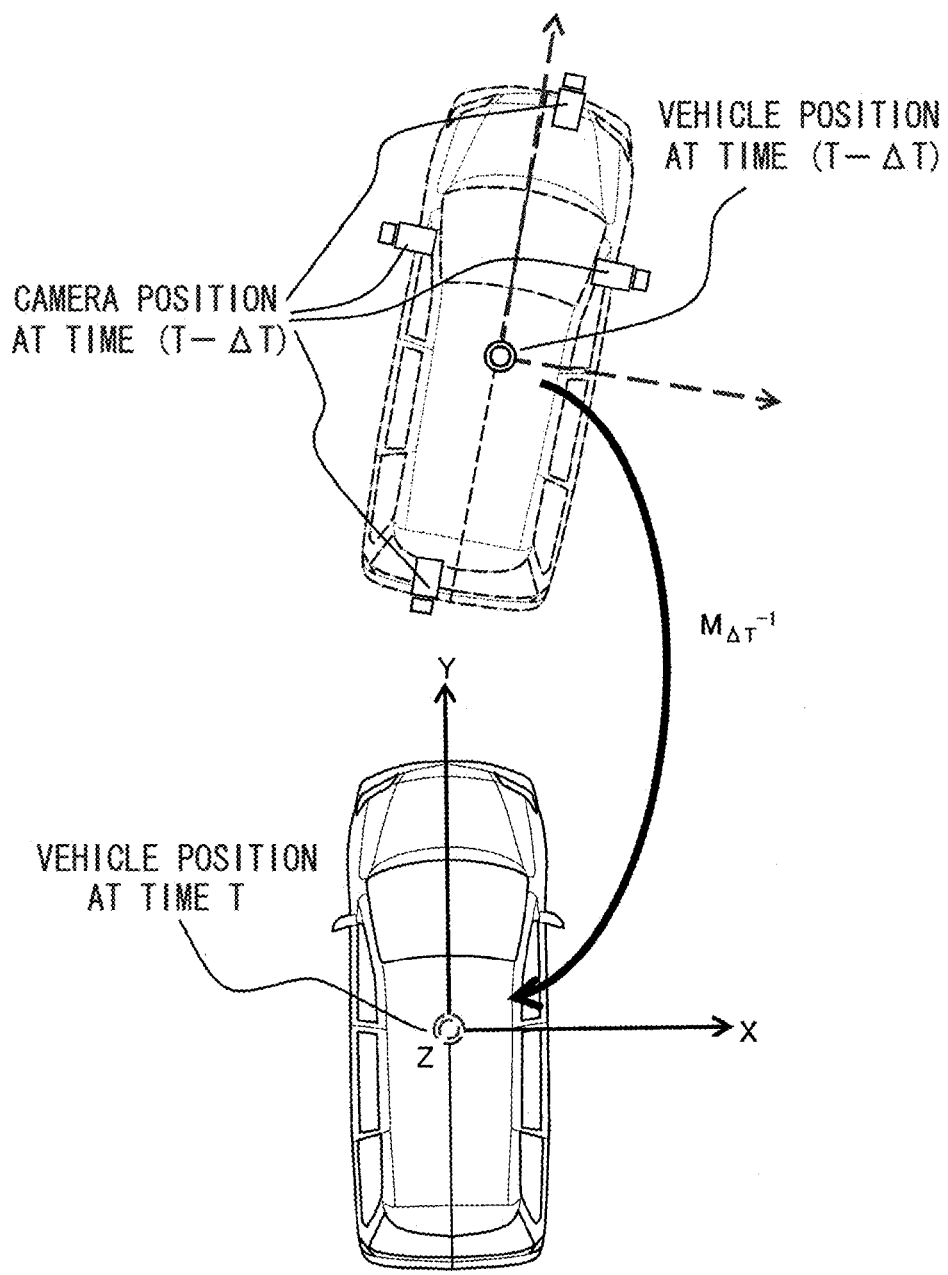
FIG. 15 is a schematic diagram to explain a vehicle position and camera positions at time (T−ΔT)

The matrix $M_{\Delta T}$ is a matrix for converting coordinate values in the vehicle coordinate system at current time T to coordinate values in the vehicle coordinate system at time (T–$\Delta T$). Thus, as illustrated in FIG. 15, the vehicle position and camera mounting positions at time (T–$\Delta T$) can be converted into the vehicle coordinate system at current time T by employing the inverse matrix $M_{\Delta T}^{-1}$ of the matrix $M_{\Delta T}$. Namely, the camera positions can be derived at time (T–$\Delta T$), as expressed in the vehicle coordinate system at current time T. Then, the points P3, P4 in the missing portions of the all-round image at current time T are in-filled with the pixel values of pixels in the camera image captured at time (T–$\Delta T$) corresponding to the respective points $C_3$, $C_4$.

Figure 16:
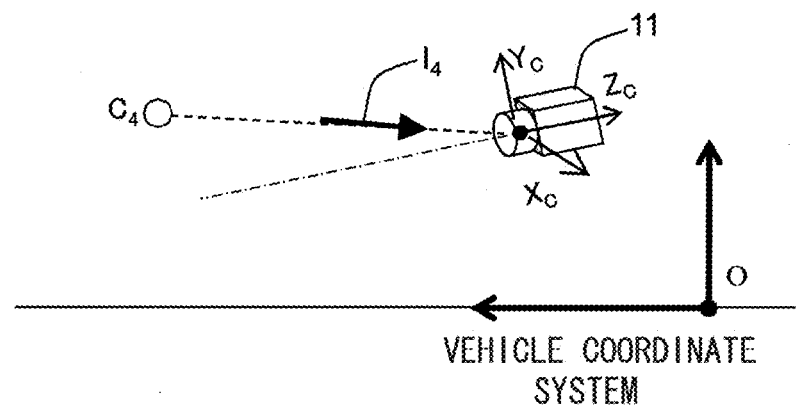
FIG. 16 is a schematic diagram to explain a relationship between a vehicle coordinate system and a camera coordinate system.

Incident light vectors $I_3$, $I_4$ from the points $C_3$, $C_4$ towards the respective camera 11 are employed to determine the pixels that correspond to the points $C_3$, $C_4$ in the camera images captured at time (T–$\Delta T$). Thus as described above, by employing the inverse matrix $M_{\Delta T}^{-1}$ of the matrix $M_{\Delta T}$, the position of the respective camera 11 at time (T–$\Delta T$), as expressed in the vehicle coordinate system at current time T, is known. Hence, as illustrated in FIG. 16, the incident light vectors $I_3$, $I_4$ from the points $C_3$, $C_4$ towards the respective cameras 11 at the positions of time (T–$\Delta T$) can be computed (only the incident light vector 14 from the point $C_4$ towards the camera 11 is illustrated in FIG. 16). Note that $X_C$, $Y_C$, $Z_C$ in FIG. 16 indicates each of the axes of a coordinate system of the camera 11 that captured the point $C_4$.

Since the incident light vectors $I_3$, $I_4$ are defined in the vehicle coordinate system at the current time T, they are converted into incident light vectors $I^*_3$, $I^*_4$ expressed in the vehicle coordinate system at time (T–$\Delta T$) using the following Equation (2).

$$i\, I^*_n = M_{\Delta T} I \quad (2)$$

Conversion of vectors between the vehicle coordinate system and each of the respective camera coordinate systems can be performed with a 4×4 matrix MC. The matrix MC can be determined by the mounting position and mounting angle of each of the cameras 11 with respect to the vehicle 1, and is determined by measurement in advance. Employing the matrix MC enables incident light vectors $I_{3C}$, $I_{4C}$ in the camera coordinate system to be derived according to the following Equation (3).

$$I_{nC} = MCI^*_n = MCM\Delta TI_n \quad (3)$$

Figure 17:
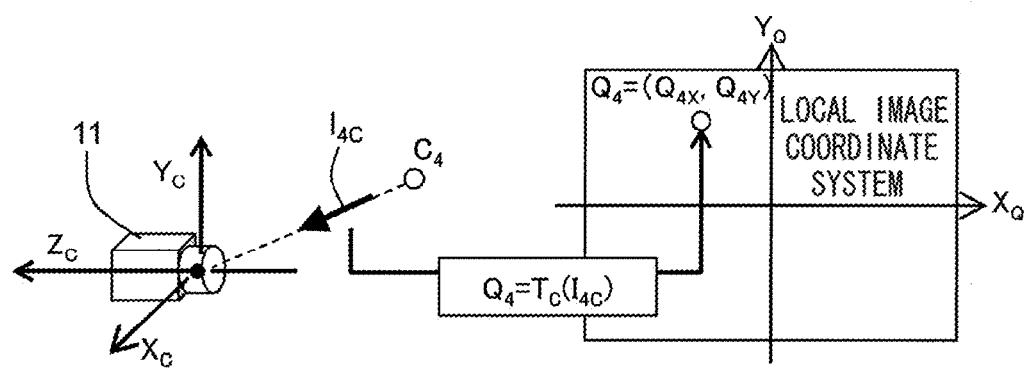
FIG. 17 is a schematic diagram to explain a relationship between a camera coordinate system and a local image coordinate system.

Moreover, as illustrated in FIG. 17, the pixels $Q_{3(T-\Delta T)}$, $Q_{4(T-\Delta T)}$ corresponding to the incident light vectors $I_{3C}$, $I_{4C}$ in the camera images constructing the texture image at time (T−ΔT) are derived according to the following Equation (4).

$$Q_{n(T-\Delta T)} = T_C(I_{nC}) \quad (4)$$

Wherein $T_C$ is a function or table expressing a relationship between incident light vectors and positions of each of the pixels of camera images that have been determined for each of the cameras 11, with these being computable in advance from parameters such as the lens distortion of the cameras 11. Moreover, n in Equation (2) to Equation (4) is any positive integer, and in this case n=3, 4. Moreover, $X_Q$, $Y_Q$ in FIG. 17 are respective axes of the local image coordinate systems of the respective cameras 11 that have captured points $C_3$, $C_4$, and $(Q_{4X(T-\Delta T)}, Q_{4Y(T-\Delta T)})$ are coordinate values of the pixel $Q_{4(T-\Delta T)}$ of the camera image at time (T−ΔT) in the respective local image coordinate system. The coordinate values $(Q_{nX(T-\Delta T)}, Q_{nY(T-\Delta T)})$ in the thus derived local image coordinate system are converted into texture coordinate values $(s_{n(T-\Delta T)}, t_{n(T-\Delta T)})$ using a correspondence relationship between the coordinate values in the local image coordinate system and the texture image coordinate values. This thereby enables the infill-use projection plane polygon data to be created.

The projection plane polygon data creation section 24 outputs projection plane polygon data created at current time T and infill-use projection plane polygon data to the image synthesis section 26.

Figure 18:
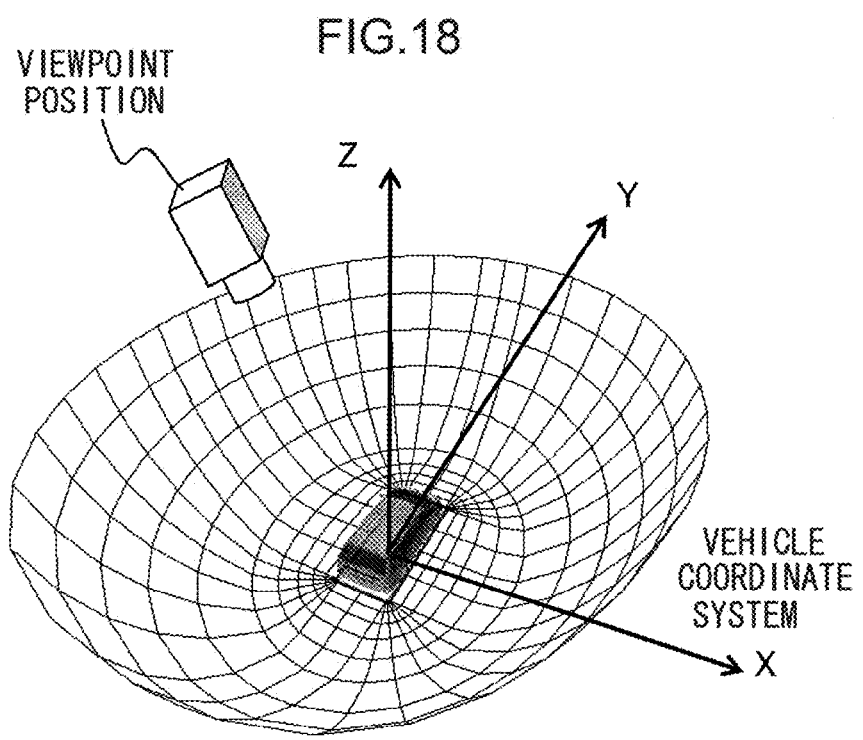
FIG. 18 is a schematic diagram illustrating an example of a viewpoint position.

The viewpoint position determination section 25 determines a viewpoint position to be used in the image synthesis section 26 for synthesizing an all-round image, as illustrated in FIG. 18. The viewpoint position determination section 25 identifies the state of the vehicle 1 (such as proceeding forwards, reversing) based on each of the sensor values detected by the steering angle sensor 15, the brake sensor 16 and the direction indicator lamp sensor 17, and then determines the selection of viewpoint position according to the vehicle 1 state from out of plural pre-stored viewpoint positions. The viewpoint position determination section 25 outputs data for the determined viewpoint position to the image synthesis section 26.

The image synthesis section 26 refers to the texture image storage section 30 and the solid object mask image storage section 32, and synthesizes an all-round image of the texture image at current time T projected onto the three dimensional projection plane 8 as viewed from the viewpoint position determined by the viewpoint position determination section 25. The synthesized all-round image is then stored in the synthesized image storage section 34. The image synthesis section 26 then references the past image set that is stored in the past image set storage section 33B, and synthesizes an all-round image of the texture image at past time (T−ΔT) projected onto the three dimensional projection plane 8 at current time T as viewed from the above viewpoint position. When doing so, the image synthesis section 26 performs overlay rendering of the pixel values of the texture image at time (T−ΔT) for the pixels representing solid objects on the synthesized image stored in the synthesized image storage section 34. Note that "image rendering" refers here to writing pixel values to each of the pixels of the synthesized image. Then overlay rendering is performed on the synthesized image stored on the synthesized image storage section 34 of the solid object shape, based on the 3D position data stored on the 3D position storage section 31, and a pre-recorded vehicle shape.

A more specific explanation follows regarding processing of the image synthesis section 26.

Figure 19:
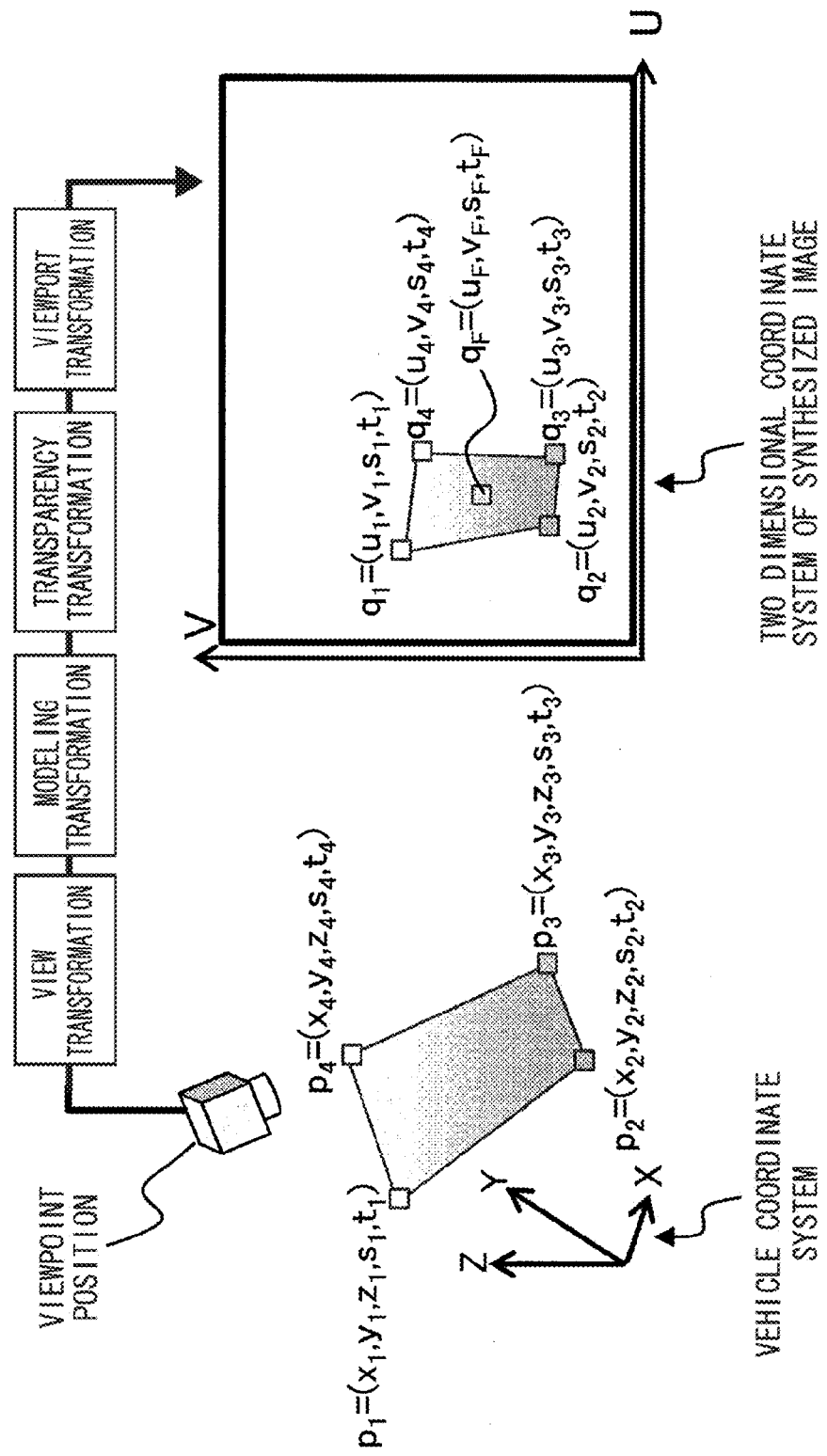
FIG. 19 is a schematic diagram to explain a relationship between a three dimensional projection plane and a synthesized image.

Synthesis of the all-round image from the texture image projected onto the three dimensional projection plane 8 can be implemented by mapping the projection plane polygon data representing the three dimensional projection plane 8 onto a synthesized image below a given viewpoint position. Such processing can be readily implemented using ordinary 3D computer graphics. FIG. 19 illustrates mapping of a quadrangular polygon represented by 4 apex points $p_i$ (wherein i=1, 2, 3, 4) onto a synthesized image. Each of the apex points $p_i$ is defined in 5 dimensions, these being its polygon apex point coordinate values (three dimensional coordinates) in the vehicle coordinate system and its texture coordinate values in a texture image (two dimensional coordinates), based on the projection plane polygon data created by the projection plane polygon data creation section 24. Each of the apex points $p_i$ is mapped onto respective pixels $q_i$ (wherein i=1, 2, 3, 4) of the synthesized image via view transformation, modeling transformation, transparency transformation and viewport transformation that is a basic geometric transformation of 3D computer graphics below the viewpoint position determined by the viewpoint position determination section 25. Note that V, U in FIG. 19 are respective axes in the two dimensional coordinate system of the synthesized image. $q_i$ are four dimensional vector amounts of two dimensional coordinate values in a coordinate system of the synthesized image and corresponding texture coordinate values (two dimensional coordinates). If single pixels inside a quadrangular shape surrounded by 4 apex points $q_1$, $q_2$, $q_3$, $q_4$ are denoted by $q_F=(u_F, v_F, s_F, t_F)$ then since $(u_F, v_F)$ are known, $(s_F, t_F)$ can be computed from the 4 apex points $q_i$ by linear interpolation in UV space.

The pixel values of the pixels $q_F$ on the synthesized image are determined based on the texture image and the solid object mask image. Specifically, first, using the solid object mask image at the current time T, determination is made as to whether or not the pixel of the texture coordinate value $(s_F, t_F)$ of the texture image is a pixel representing a solid object. Image rendering is skipped when the pixel represents a solid object. However, when the pixel does not represent the solid object, an all-round image is synthesized in which there is no solid object projected, such as that illustrated at the top of FIG. 20, by writing pixel values $P_F$ of pixels of the texture coordinate values $(s_F, t_F)$ of the texture image as the pixel values of the pixels $q_F$ on the synthesized image. At this stage the pixels of the synthesized image that have skipped image rendering are pixels without pixel values that will be background color, namely configure pixel value missing portions.

Then, the texture image at past time (T−ΔT) is projected onto the three dimensional projection plane 8 and then overlay rendered onto the synthesized image. This image rendering is also similar to synthesis of the texture image at current time T in that mapping is performed of the projection plane polygon data onto the synthesized image, however differs from that at the current time T in the following points:
(1) A texture image at time (T−ΔT) stored in the past image set storage section 33B is employed.
(2) Infill-use projection plane polygon data is employed.

(3) Overlay rendering is not performed when pixel values of the texture image at current time T have already been written onto the synthesized image.

Figure 20:
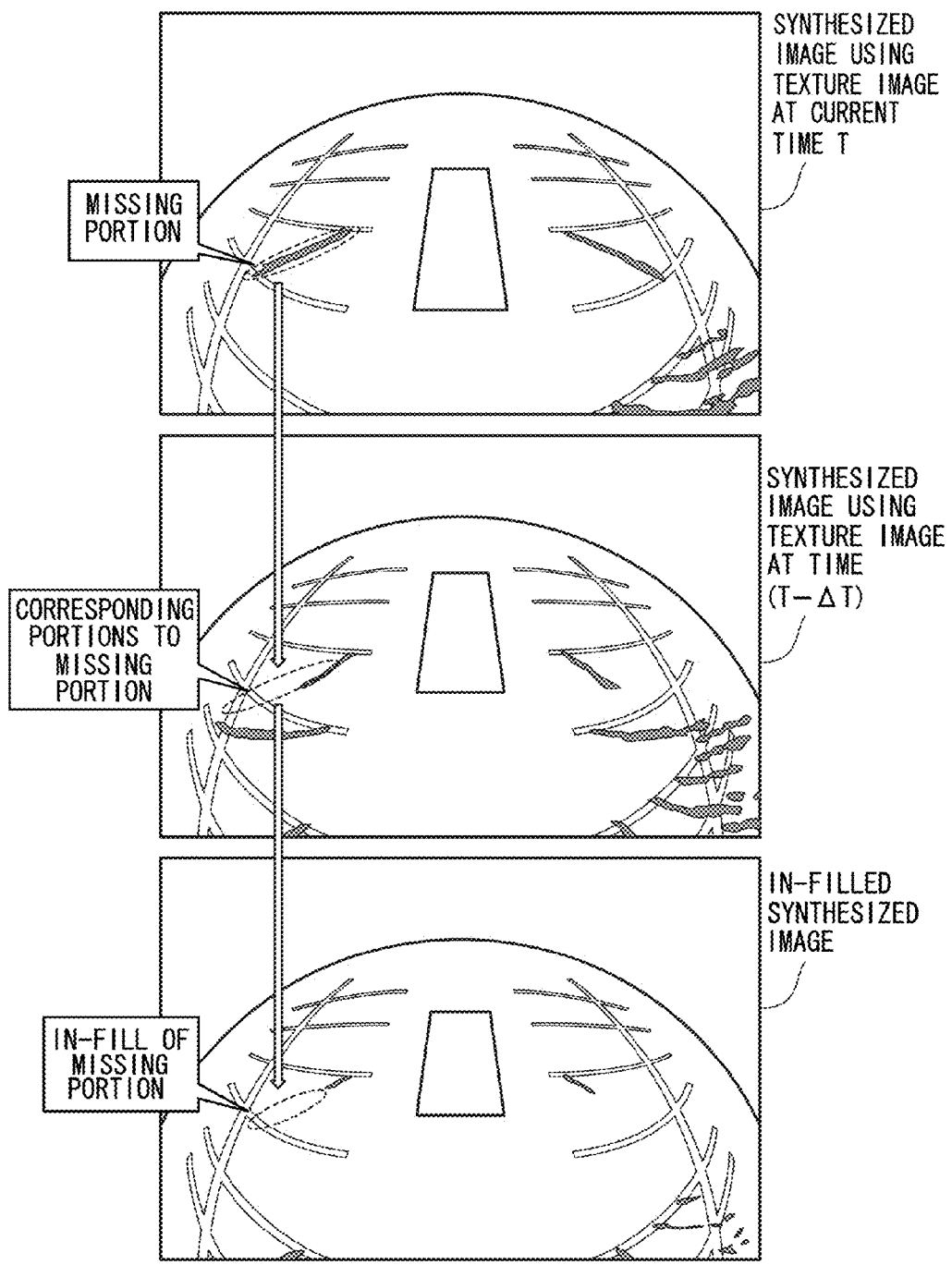
FIG. 20 is a sketch diagram to explain infilling of missing portions in the first exemplary embodiment.

An example is illustrated at the middle of FIG. 20 of a synthesized image that has been image rendered based on a texture image at time (T−ΔT) as infill-use projection plane polygon data. Note that since the synthesized image at time (T−ΔT) is applied only to the pixel value missing portions arising from the presence of solid objects, no actual overlay rendering is performed. Accordingly, as illustrated at the bottom of FIG. 20, an all-round image in which the missing portions have been in-filled can be synthesized by overlaying the pixel values of the texture image at the past time (T−ΔT) onto the pixel value missing portions in the synthesized image at current time T.

Figure 21:
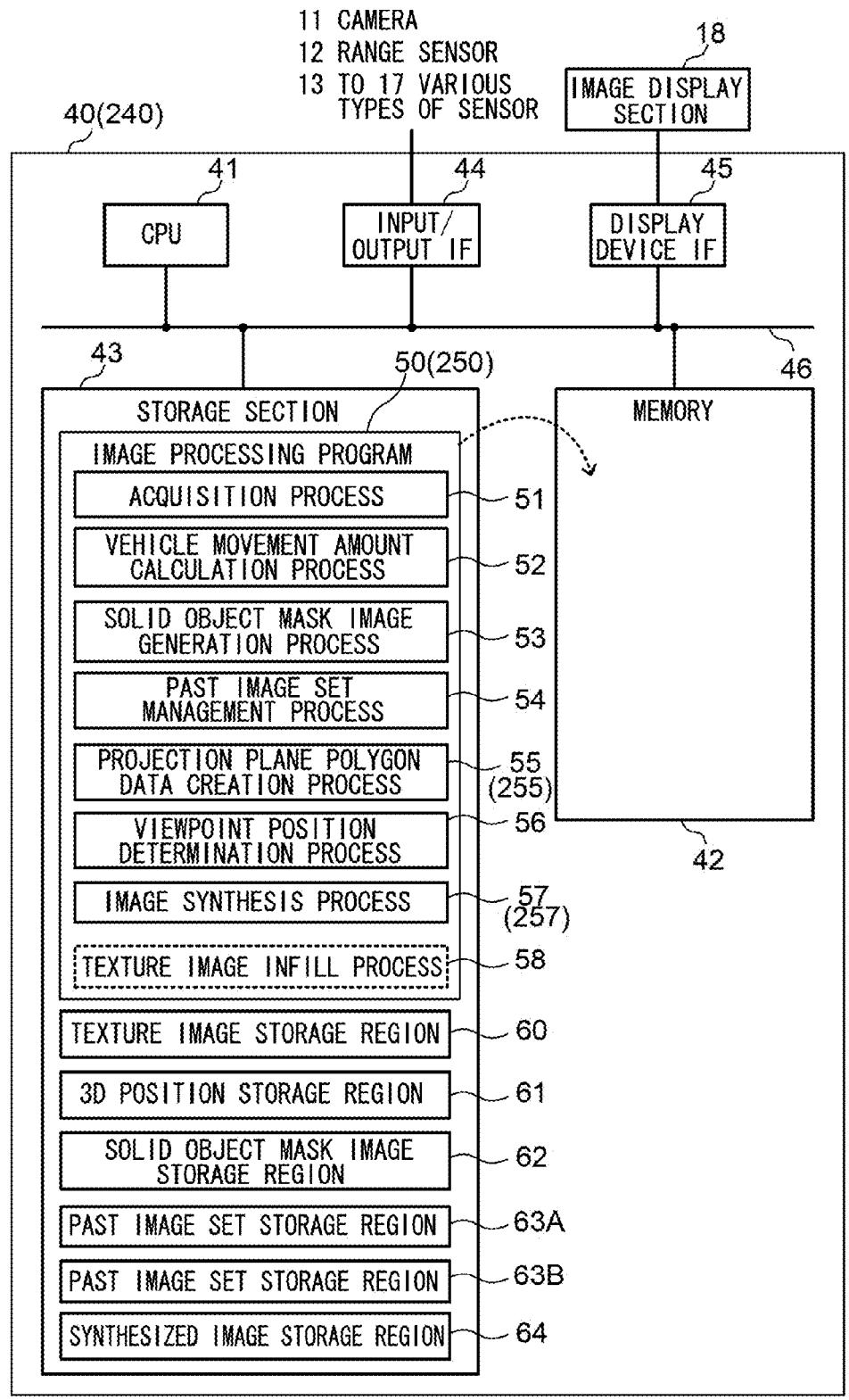
FIG. 21 is a schematic block diagram illustrating an example of a computer that functions as an image processing apparatus.

The image processing apparatus 10 may be implemented by a computer 40 such as for example illustrated in FIG. 21. The computer 40 includes a CPU 41, a memory 42, a nonvolatile storage section 43, an input/output interface (IF) 44 and a display device IF 45. The CPU 41, the memory 42, the storage section 43, the input/output IF 44 and the display device IF 45 are connected together through a bus 46.

The computer 40 is connected through the input/output IF 44 to the cameras 11, the range sensors 12, the vehicle speed sensor 13, the gyro sensor 14, the steering angle sensor 15, the brake sensor 16 and the direction indicator lamp sensor 17. Moreover, the computer 40 is connected to the image display section 18 through the display device IF 45.

The storage section 43 can be implemented by for example a Hard Disk Drive (HDD) or a flash memory. The storage section 43 serving as a storage medium is stored with an image processing program 50 for causing the computer 40 to function as the image processing apparatus 10. Moreover, the storage section 43 is provided with a texture image storage region 60, a 3D position storage region 61, a solid object mask image storage region 62, past image set storage regions 63A, 63B, and a synthesized image storage region 64. The CPU 41 reads the image processing program 50 from the storage section 43, expands the program in the memory 42, and then sequentially executes processes of the image processing program 50.

The image processing program 50 includes an acquisition process 51, a vehicle movement amount calculation process 52, a solid object mask image generation process 53, a past image set management process 54, a projection plane polygon data creation process 55, a viewpoint position determination process 56 and an image synthesis process 57. The CPU 41 operates as the acquisition section 20 illustrated in FIG. 1 by execution of the acquisition process 51. The CPU 41 operates as the vehicle movement amount calculation section 21 illustrated in FIG. 1 by execution of the vehicle movement amount calculation process 52. The CPU 41 operates as the solid object mask image generation section 22 illustrated in FIG. 1 by execution of the solid object mask image generation process 53. The CPU 41 operates as the past image set management section 23 illustrated in FIG. 1 by execution of the past image set management process 54. The CPU 41 operates as the projection plane polygon data creation section 24 illustrated in FIG. 1 by execution of the projection plane polygon data creation process 55. The CPU 41 operates as the viewpoint position determination section 25 illustrated in FIG. 1 by execution of the viewpoint position determination process 56. The CPU 41 operates as the image synthesis section 26 illustrated in FIG. 1 by execution of the image synthesis process 57.

When the image processing apparatus 10 is implemented by the computer 40, the texture image storage region 60 functions as the texture image storage section 30 illustrated in FIG. 1. Moreover, the 3D position storage region 61 functions as the 3D position storage section 31 illustrated in FIG. 1. The solid object mask image storage region 62 functions as the solid object mask image storage section 32 illustrated in FIG. 1. The past image set storage regions 63A, 63B function as the past image set storage sections 33A, 33B illustrated in FIG. 1. The synthesized image storage region 64 functions as the synthesized image storage section 34 illustrated in FIG. 1. The computer 40 executing the image processing program 50 accordingly functions as the image processing apparatus 10.

Note that it is possible to implement the image processing apparatus 10 by for example a semiconductor integrated circuit, and more precisely by for example an Application Specific Integrated Circuit (ASIC).

Figure 22:
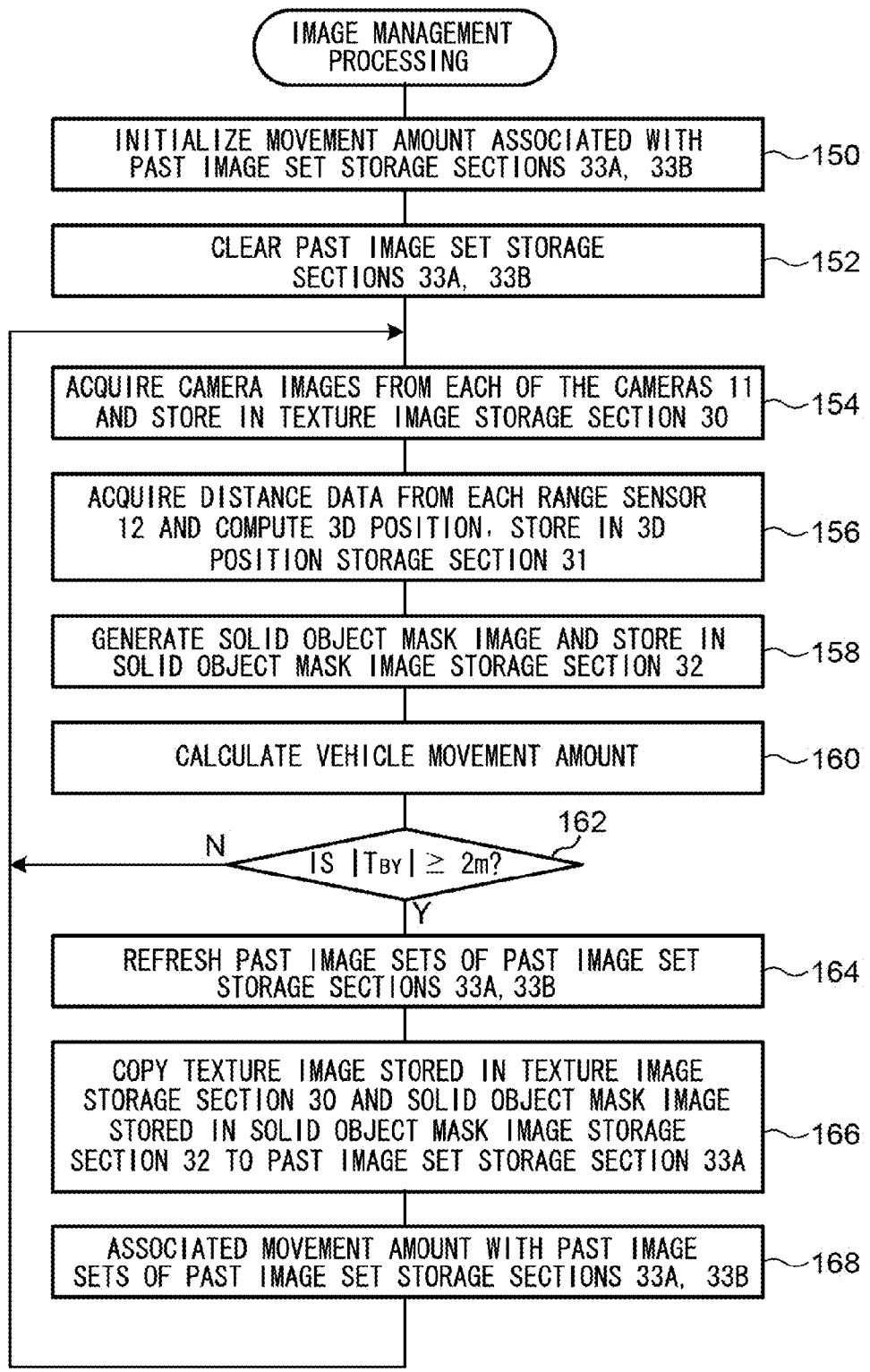
FIG. 22 is a flow chart illustrating an image management process.
Figure 23:
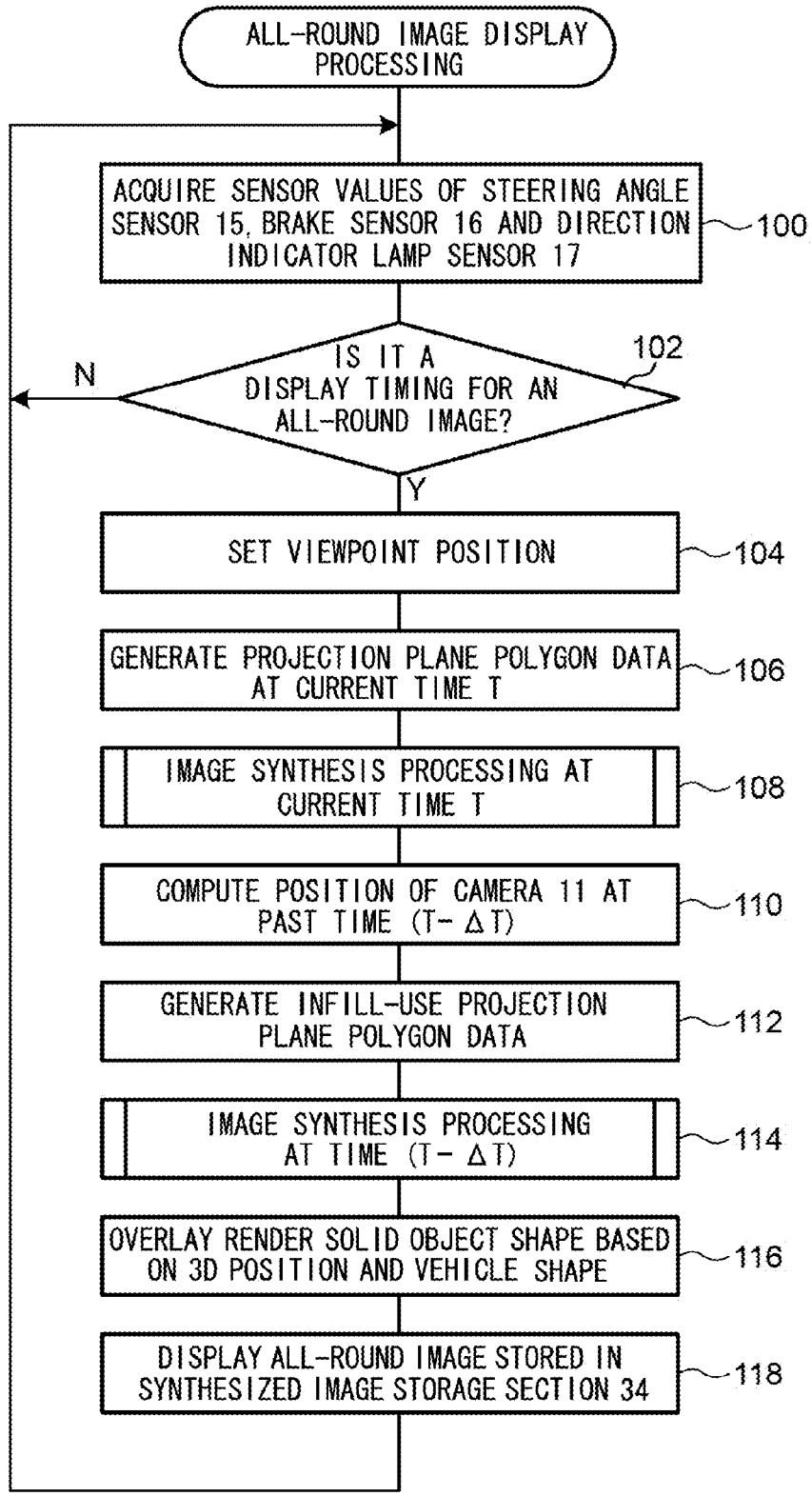
FIG. 23 is a flow chart illustrating all-round image display processing in the first exemplary embodiment.

Explanation now follows regarding operation of the first exemplary embodiment. Image management processing as illustrated in FIG. 22 is started in the image processing apparatus 10 when the image processing apparatus 10 is started up. Moreover, in the image processing apparatus 10, all-round image display processing as illustrated in FIG. 23 is executed in parallel to the image management processing. Detailed explanation follows regarding each processing.

Explanation first follows regarding the image management processing (FIG. 22). At step 150, the past image set management section 23 initializes the movement amount of the vehicle 1 associated with the past image sets stored in the past image set storage sections 33A, 33B. For example, the movement amount associated with the past image set storage section 33A may be set to $(T_{AX}, T_{AY}, \theta) = (0, 1\ m, \theta)$, and the movement amount associated with the past image set storage section 33B may be set to $(T_{BX}, T_{BY}, \theta) = (0, 2\ m, \theta)$.

Next at step 152, the past image set management section 23 clears data stored in the past image set storage sections 33A, 33B.

Next at step 154, the acquisition section 20 acquires each of the camera images captured by the respective cameras 11, constructs a texture image with each of the acquired camera images, associates the capture time with the camera images and stores them in the texture image storage section 30.

Next at step 156, the acquisition section 20 acquires distance data measured by the respective range sensors 12 and their laser pulse emission angles, and computes 3D positions for each of the measurement points. 3D position data representing the computed 3D positions and the measurement time of the distance data are stored associated with each other in the 3D position storage section 31.

Next at step 158, based on the 3D position data stored in the 3D position storage section 31, the solid object mask image generation section 22 generates the solid object mask image to identify the pixels representing solid objects in the texture image. Each of the mask values RF of the solid object mask image is 1 when the pixel of the texture image corresponding to the pixel position is a pixel that represents a solid object, and is 0 when it is a pixel that does not represent a solid object. The solid object mask image generation section 22 stores the generated solid object mask image in the solid object mask image storage section 32.

Next, at step 160, the acquisition section 20 acquires sensor values output from the vehicle speed sensor 13 and the gyro sensor 14 and outputs them to the vehicle movement amount calculation section 21. The vehicle movement amount calculation section 21 then calculates the movement amount $(T_{AX}, T_{AY}, \theta_A)$ of the vehicle 1 in the interval $(\Delta T_A)$ between the time $(T-\Delta T_A)$ associated with the past image set stored in the past image set storage section 33A and the current time T. Similarly, the vehicle movement amount calculation section 21 also calculates the movement amount ($T_{BX}$, $T_{BY}$, $\theta_B$) of the vehicle 1 in the interval ($\Delta T_B$) between the time (T−$\Delta T_B$) associated with the past image set stored in the past image set storage section 33B and the current time T. The movement amount initialized at step 150 is employed when past image sets are not stored in the past image set storage sections 33A, 33B.

Next at step 162, determination is made as to whether or not |$T_{BY}$| is 2 m or greater in the movement amounts calculated at step 160. Processing proceeds to step 164 when |$T_{BY}$|>2 m, and processing returns to step 154 when |$T_{BY}$|<2 m. Note that "2 m" is an example of a movement amount of the vehicle 1 in the interval $\Delta T$ that is employed for managing saving or discarding past image sets, and a different value may be employed therefor.

At step 164, the past image set management section 23 discards the past image set stored in the past image set storage section 33B. At the same time, the past image set management section 23 also transfers the past image set stored in the past image set storage section 33A into the past image set storage section 33B. Next at step 166, the past image set management section 23 copies the texture image stored in the texture image storage section 30 and the solid object mask image stored in the solid object mask image storage section 32 into the past image set storage section 33A.

Next at step 168, the vehicle movement amount calculation section 21 calculates the movement amounts in the intervals between the capture times associated with the past image sets stored in the past image set storage sections 33A, 33B and the current time. The past image set management section 23 then associates and stores the calculated movement amounts with the respective past image sets stored in the past image set storage sections 33A, 33B and processing then returns to step 154.

Explanation next follows regarding all-round image display processing (FIG. 23). At step 100, the acquisition section 20 acquires the sensor values detected by the steering angle sensor 15, the brake sensor 16 and the direction indicator lamp sensor 17 and outputs these to the viewpoint position determination section 25.

Next at step 102, the viewpoint position determination section 25 identifies the state of the vehicle 1 (such as proceeding forwards, reversing) based on each of the sensor values acquired at step 100. The viewpoint position determination section 25 then determines whether or not it is a predetermined timing for displaying an all-round image, based on the identified state of the vehicle 1. Processing proceeds to step 104 when it is a timing for displaying an all-round image, and processing returns to step 100 when it is not a timing for displaying the all-round image.

Next at step 104, based on the state of the vehicle 1 identified in step 102 the viewpoint position determination section 25 selects and determines a viewpoint position that accords with the state of the vehicle 1 from plural pre-stored viewpoint positions.

Next at step 106, the projection plane polygon data creation section 24 reads, from a specific storage region, 3D polygon data representing the vehicle 1 at the current time T inside the three dimensional projection plane 8. Then the projection plane polygon data creation section 24 associates each of the polygon apex point coordinate values (X, Y, Z) of the 3D polygon data with the texture coordinate values ($S_{(T)}$, $T_{(T)}$) of the texture image at time T stored in the texture image storage section 30. Projection plane polygon data for the current time T is accordingly created.

Figure 24:
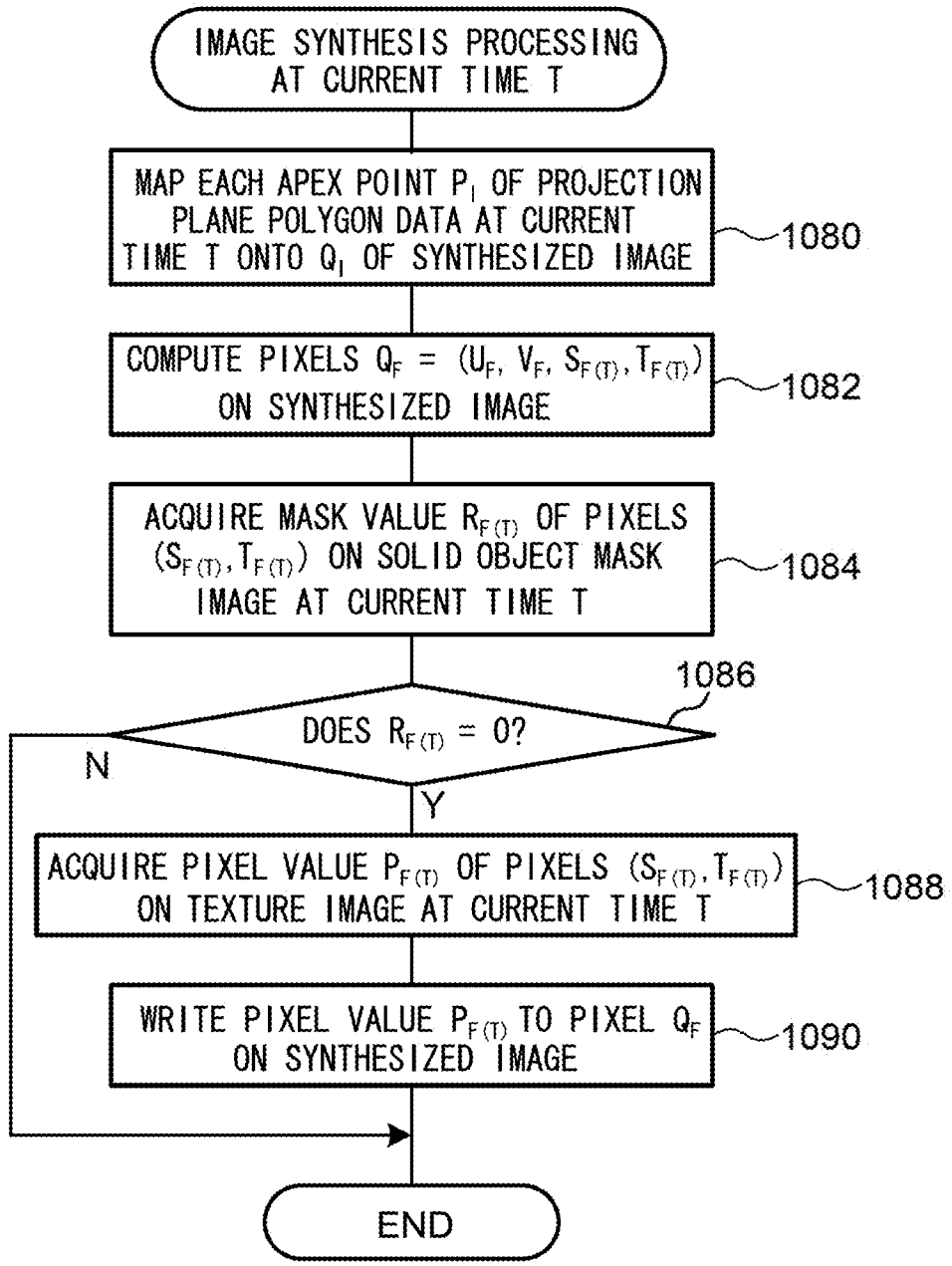
FIG. 24 is a flow chart illustrating image synthesis processing at current time T.

Next at step 108 image synthesis processing at current time T is executed. Explanation next follows regarding image synthesis processing at current time T, with reference to FIG. 24.

At step 1080 of the image synthesis processing at current time T (FIG. 24), the image synthesis section 26 maps each of the apex points $p_i$ of the projection plane polygon data at current time T created at step 106 onto the pixels $q_i$ on the synthesized image below the viewpoint position determined at step 104.

Next at step 1082 the image synthesis section 26 computes single pixels $q_F=(u_F, v_F, s_{F(T)}, t_{F(T)})$ inside a quadrangular shape surrounded by the 4 apex points pixels $q_1$, $q_2$, $q_3$, $q_4$ on the synthesized image.

Next at step 1084, the image synthesis section 26 acquires mask values $R_{F(T)}$ of the pixels ($s_{F(T)}$, $t_{F(T)}$) expressed in $q_F=(u_F, v_F, s_{F(T)}, t_{F(T)})$, with reference to the solid object mask image at current time T stored in the solid object mask image storage section 32.

Next at step 1086, the image synthesis section 26 determines whether or not the pixels ($s_{F(T)}$, $t_{F(T)}$) of the texture image are pixel value missing portions arising from the presence of solid objects by determining whether or not the mask values $R_{F(T)}$ acquired at step 1084 are 0. Determination is that they are not missing portions when $R_{F(T)}=0$, and processing proceeds to step 1088.

At step 1088, the image synthesis section 26 acquires pixel values $P_{F(T)}$ of the pixels ($s_{F(T)}$, $t_{F(T)}$) of the texture image at current time T stored in the texture image storage section 30. Then at step 1090, the image synthesis section 26 writes the pixel values $P_{F(T)}$ acquired at step 1088 onto the pixel values of the pixels $q_F$ on the synthesized image.

However, determination is made that the pixels ($s_{F(T)}$, $t_{F(T)}$) of the texture image are pixel value missing portions arising from the presence of solid objects when $R_{F(T)}=1$ at step 1086, and steps 1088 and 1090 are skipped. In such cases, the pixels on the synthesized image are pixels without a pixel value that will be background color.

A synthesized image to which the processing of steps 1084 to 1090 has been performed for all the pixels on the synthesized image is stored in the synthesized image storage section 34.

Returning to the all-round image display processing (FIG. 23), next, at step 110, the projection plane polygon data creation section 24 acquires the movement amount in the interval $\Delta T_B$ of the vehicle 1 associated with the past image set stored in the past image set storage section 33B. The projection plane polygon data creation section 24 employs the acquired movement amount in interval $\Delta T_B$ to define a 4×4 coordinate conversion matrix $M_{\Delta T}$ as illustrated in Equation (1). The projection plane polygon data creation section 24 then uses the inverse matrix $M_{\Delta T}^{-1}$ of the matrix $M_{\Delta T}$ to compute the position of the respective camera 11 at time (T−$\Delta T$) as expressed in the vehicle coordinate system at current time T.

Then at step 112, the projection plane polygon data creation section 24 computes for each of the apex points of each polygon in the 3D polygon data read at step 106, the incident light vector $I_n$ from each of projection points $C_n$ projected onto the virtual viewpoint projection plane 7 to the respective camera 11. The position of the respective camera 11 is the position of the camera 11 computed at step 110. The projection plane polygon data creation section 24 then uses Equation (2) and Equation (3) to compute incident light vectors $I_{nC}$ in the camera coordinate system from the incident light vectors $I_n$. The projection plane polygon data creation section 24 also computes the positions $Q_n$ in the local image coordinate system of the camera images corresponding to the incident light vectors $I_{nC}$ using Equation (4). The projection plane polygon data creation section 24 then converts the positions $Q_n$ that are local image coordinate values into texture coordinate values, based on correspondence relationships between the local image coordinate systems and the texture image coordinate system. Each of the polygon apex point coordinate values (X, Y, Z) of the 3D polygon data are thereby associated with texture coordinate values $(s_{F(T-\Delta T)}, t_{F(T-\Delta T)})$ of the texture image stored in the past image set storage section 33B. Infill-use projection plane polygon data is thereby created.

Figure 25:
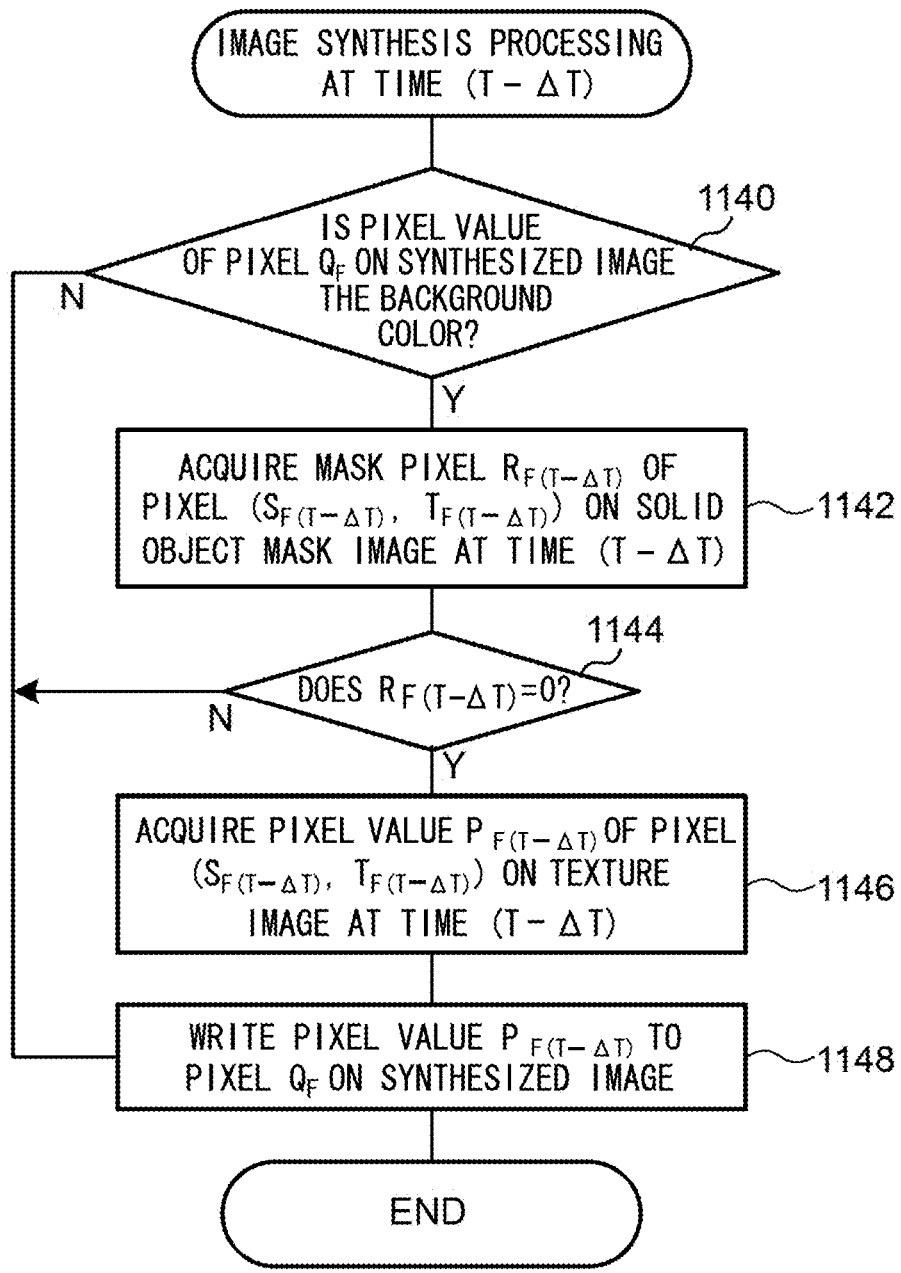
FIG. 25 is flow chart illustrating image synthesis processing at time (T−ΔT)

Next at step 114, image synthesis processing at time $(T-\Delta T)$ is executed. Explanation follows regarding the image synthesis processing at time $(T-\Delta T)$, with reference to FIG. 25.

At step 1140 of the image synthesis processing at time $(T-\Delta T)$ (FIG. 25), the image synthesis section 26 determines whether or not the pixel values of the pixels $q_F$ on the synthesized image stored in the synthesized image storage section 34 are background color. Processing proceeds to step 1142 when the pixel values of the pixels $q_F$ are background color. At step 1142, the image synthesis section 26 acquires $(s_{F(T-\Delta T)}, t_{F(T-\Delta T)})$ corresponding to $(u_F, v_F)$ of the pixels $q_F=(u_F, v_F, s_{F(T)}, t_{F(T)})$ on the synthesized image from the infill-use projection plane polygon data created at step 112. The image synthesis section 26 then refers to the solid object mask image at time $(T-\Delta T)$ stored in the past image set storage section 33B, and acquires the mask values $R_{F(T-\Delta T)}$ of the pixels $(s_{F(T-\Delta T)}, t_{F(T-\Delta T)})$.

Next at step 1144, the image synthesis section 26 determines whether or not the mask values $R_{F(T-\Delta T)}$ acquired at step 1142 are 0. Determination is thereby made as to whether or not the pixels $(s_{F(T-\Delta T)}, t_{F(T-\Delta T)})$ of the texture image at time $(T-\Delta T)$ are pixel value missing portions arising from the presence of solid objects. Determination is that they are not missing portions when $R_{F(T-\Delta T)}=0$, and processing proceeds to step 1146.

At step 1146, the image synthesis section 26 acquires the pixel values $P_{F(T-\Delta T)}$ of the pixels $(s_{F(T-\Delta T)}, t_{F(T-\Delta T)})$ of the texture image at time $(T-\Delta T)$ stored in the past image set storage section 33B. Then at step 1148, the image synthesis section 26 writes the pixel values $P_{F(T-\Delta T)}$ acquired at step 1146 to the pixel values of the pixels $q_F$ on the synthesized image.

However, determination is made at step 1144 that the pixels $(s_{F(T-\Delta T)}, t_{F(T-\Delta T)})$ of the texture image are missing portions arising from the presence of solid objects when $R_{F(T-\Delta T)}=1$, and step 1146 and step 1148 are skipped. These pixels on the synthesized image are pixels with no pixel value that will be background color in such cases.

Moreover, steps 1142 to 1148 are skipped when determined at step 1140 that the pixel values of the pixels $q_F$ are not background color, since pixel values have already been written to the pixels $q_F$ from the texture image at current time T.

A synthesized image to which the processing of steps 1140 to 1148 has been performed for all the pixels on the synthesized image is stored in the synthesized image storage section 34.

Figure 26:
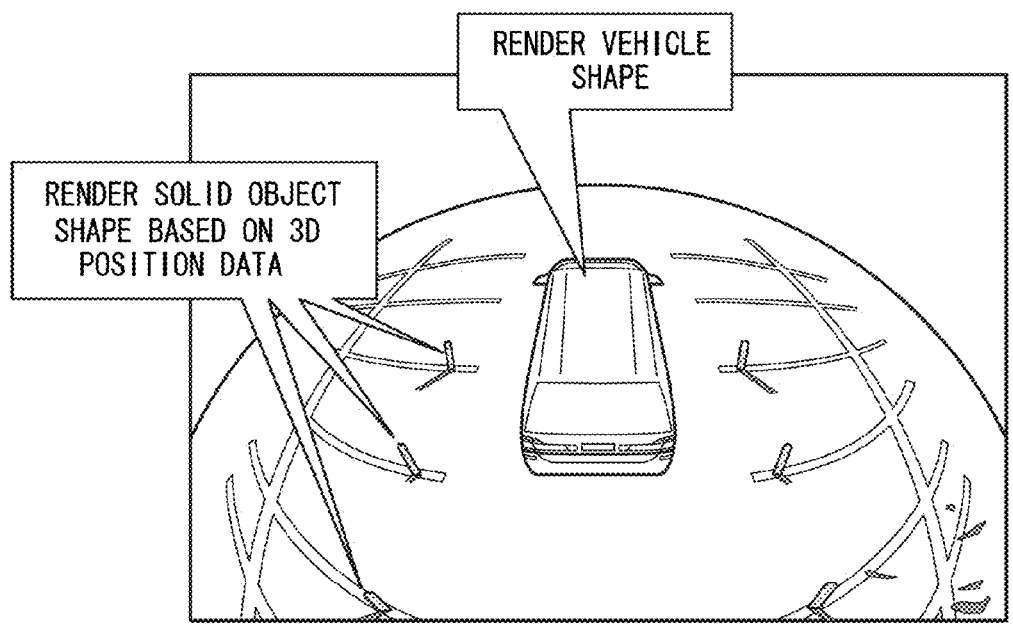
FIG. 26 is a sketch diagram to explain synthesis of a solid object shape based on 3D position data and a vehicle shape.

Processing returns to the all-round image display processing (FIG. 23). At step 116, as illustrated in FIG. 26, the image synthesis section 26 overlay renders the solid object shape based on the 3D position data stored in the 3D position storage section 31 and the pre-recorded vehicle shape onto the synthesized image stored in the synthesized image storage section 34.

Next, at step 120, the image synthesis section 26 displays the all-round image that is the synthesized image stored in the synthesized image storage section 34 on the image display section 18, and processing then returns to step 100.

As explained above, according to the image processing apparatus 10 of the first exemplary embodiment, pixel values from a previously captured image at a position different from the current position are in-filled for pixels that are missing portions without pixel values on the synthesized image, with these corresponding to positions behind a solid object. Camera parallax due to change between the current camera position and past camera position is reduced by deriving a virtual viewpoint projection for infilling using pixels of a previously prepared image. A natural synthesized image in which pixel value missing portions arising from the presence of solid objects have been eliminated can accordingly be generated in which white lines and disjointed background due to differences in camera position do not readily occur. Moreover, large fluctuations of missing portions on the screen accompanying changes in camera position due for example to movement in the vehicle installed with the camera can be suppressed due to being able to efficiently infill the pixel value missing portions arising from the presence of solid objects. Thus a contribution to a driver's safe driving is made by, for example, preventing a driver's gaze from being unintentionally attracted to the missing portions.

Note that although in the first exemplary embodiment explanation has been given of a case in which texture coordinate values are derived for all polygon apex point coordinates in the 3D polygon data in order when creating the infill-use projection plane polygon data, partial infill-use projection plane polygon data may be created. For example, configuration may be made such that in the texture image at current time T, the texture coordinate values at time $(T-\Delta T)$ are associated only with the polygon apex point coordinates corresponding to pixels determined to be pixel value missing portions arising from the presence of solid objects. Doing so enables the amount of processing to create the infill-use projection plane polygon data to be greatly reduced.

Second Exemplary Embodiment

Figure 27:
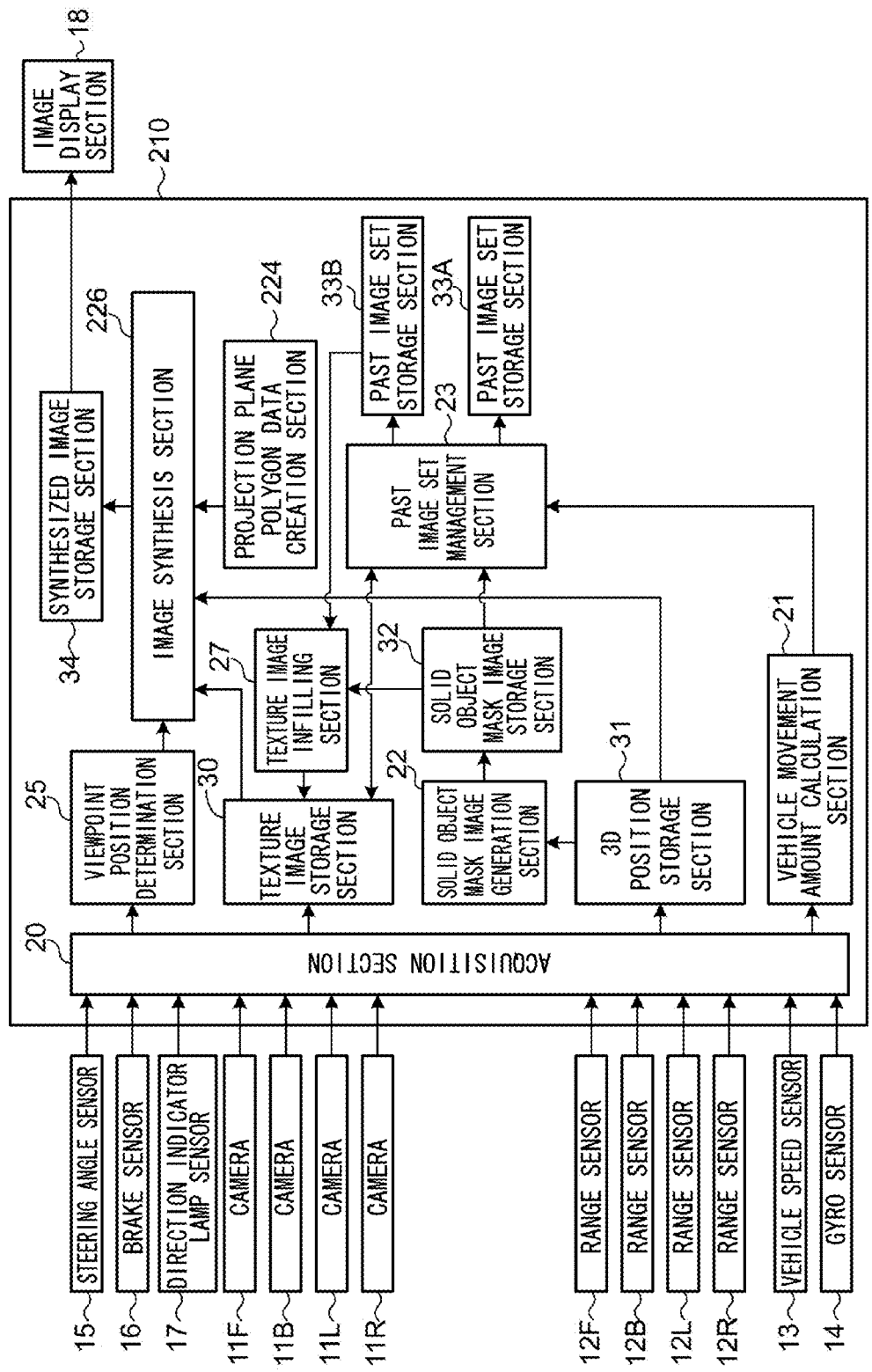
FIG. 27 is a functional block diagram illustrating an example of an image processing apparatus according to a second exemplary embodiment.

Explanation next follows regarding a second exemplary embodiment of technology disclosed herein. FIG. 27 illustrates an image processing apparatus 210 according to the second exemplary embodiment. Note that the portions of the image processing apparatus 210 of the second exemplary embodiment similar to those of the image processing apparatus 10 are allocated the same reference numerals, and detailed explanation is omitted thereof.

The image processing apparatus 210 includes an acquisition section 20, a vehicle movement amount calculation section 21, a solid object mask image generation section 22, a past image set management section 23, a projection plane polygon data creation section 224, a viewpoint position determination section 25, an image synthesis section 226 and a texture image infilling section 27. The image processing apparatus 210 also includes a texture image storage section 30, a 3D position storage section 31, a solid object mask image storage section 32, past image set storage sections 33A, 33B and a synthesized image storage section 34. Note that the projection plane polygon data creation section 224 serves as an example of (g) of technology disclosed herein. The image synthesis section 226 serves as an example of (h) of technology disclosed herein. The texture image infilling section 27 serves as an example of (f) of technology disclosed herein.

The texture image infilling section 27 in-fills pixel value missing portions arising from the presence of solid objects in a texture image at current time T stored in the texture image storage section 30 using a texture image at time (T-ΔT) stored in the past image set storage section 33B.

More specifically, the texture image infilling section 27 refers to a solid object mask image stored in the solid object mask image storage section 32, determines pixels corresponding to pixel value missing portions in the texture image at current time T, and converts these pixels into pixels $Q_{F(T)}$ in local image coordinate systems. The texture image infilling section 27 then computes the incident light vectors $I_{FC}$ in the camera coordinate systems from the points $C_F$, corresponding to the pixels $Q_{F(T)}$ on the virtual viewpoint projection plane 7, to the cameras 11. The incident light vectors $I_{FC}$ can be computed using a function or a table $T_C$ expressing relationships between the incident light vectors and positions on the camera image determined for each of the cameras 11 by reverse computation using Equation (4). The texture image infilling section 27 also computes the incident light vectors $I_F$ in the vehicle coordinate system. The incident light vectors $I_F$ can be computed using a matrix $M_C$ to convert between the vehicle coordinate system and the camera coordinate systems by reverse computation using Equation (3). The texture image infilling section 27 then identifies points $C_F$ on the virtual viewpoint projection plane 7 using the incident light vectors $I_F$ in the vehicle coordinate system.

The texture image infilling section 27 employs the movement amount $(T_X, T_Y, \theta)$ of the vehicle 1 in the interval ΔT to convert the position of the vehicle at a past time (T-ΔT) to the vehicle coordinate system at current time T using the inverse matrix $M_{\Delta T}^{-1}$ of the matrix $M_{\Delta T}$ expressed in Equation (1). A camera position at time (T-ΔT) expressed in the vehicle coordinate system at current time T may be derived thereby. Subsequent processing is similar to that of the first exemplary embodiment, as illustrated in FIG. 16 and FIG. 17, enabling the pixels $Q_{F(T-\Delta T)}$ in the texture image of the time (T-ΔT) corresponding to the points CF to be derived according to Equation (2) and Equation (3).

Figure 28:
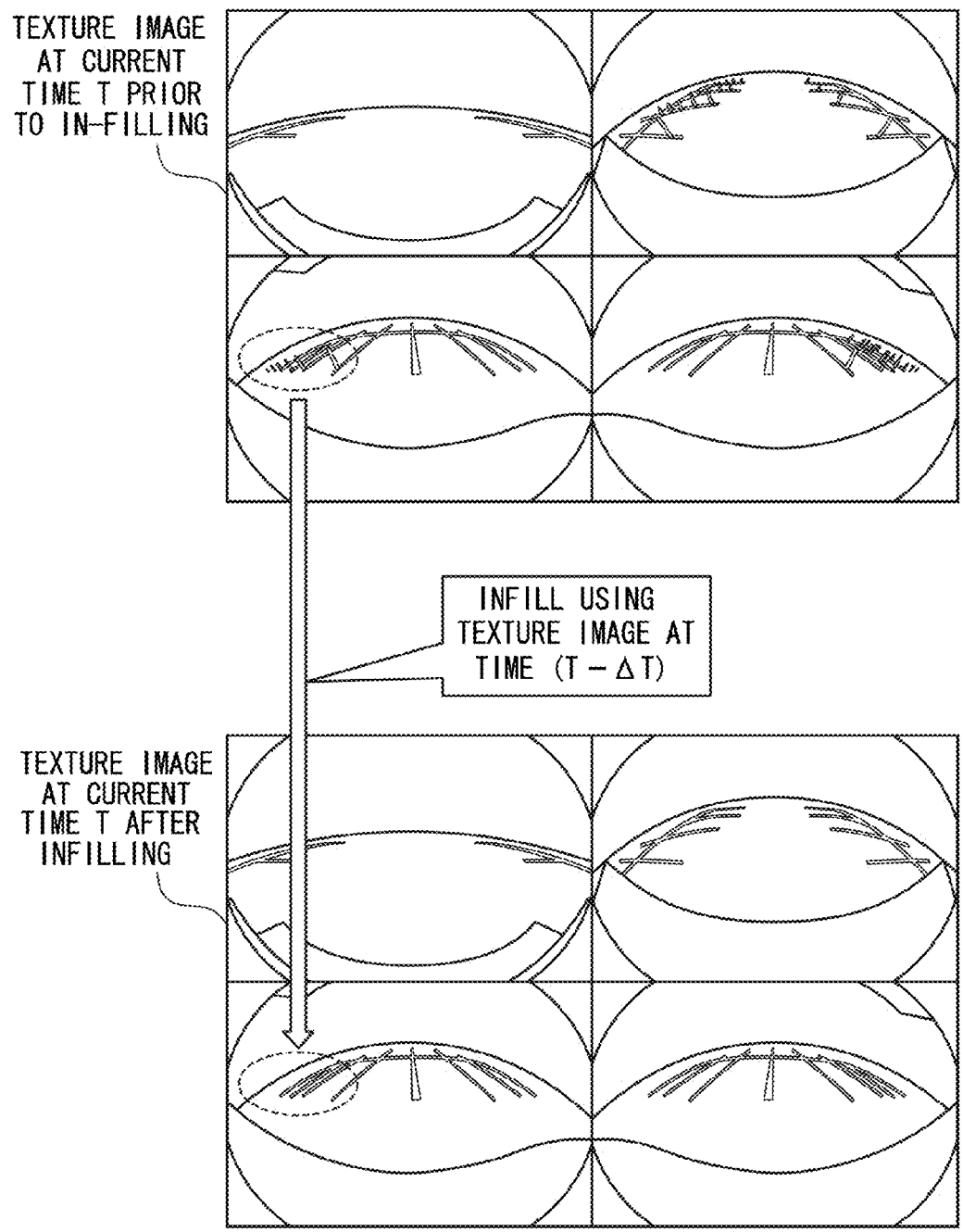
FIG. 28 is a sketch diagram to explain infilling of missing portions in the second exemplary embodiment.

The texture image infilling section 27 also acquires pixel values $P_{F(T-\Delta T)}$ of the pixels $Q_{F(T-\Delta T)}$ in the texture image at time (T-ΔT) and writes these as the pixel values of the pixels $Q_{F(T)}$ in the texture image at current time T. This thereby enables the missing portions to be in-filled in the texture image at current time T, as illustrated in FIG. 28.

The projection plane polygon data creation section 224 is similar to the projection plane polygon data creation section 24 of the first exemplary embodiment in that it generates projection plane polygon data at current time T. However, the projection plane polygon data creation section 224 differs from the first exemplary embodiment in that in-filling of the pixel value missing portions arising from the presence of solid objects is performed on the texture image, and so there is no need to generate infill-use projection plane polygon data.

The image synthesis section 226 maps the texture image at current time T, for which the missing portions have been in-filled by the texture image infilling section 27, onto the synthesized image, based on the projection plane polygon data at current time T generated by the projection plane polygon data creation section 224. An all-round image is thereby synthesized.

The image processing apparatus 210 may, similarly to in the first exemplary embodiment, be implemented by a computer 240 such as that illustrated in FIG. 21. The storage section 43 serving as a storage medium is stored with an image processing program 250 for causing the computer 240 to function as the image processing apparatus 210. The CPU 41 reads the image processing program 250 from the storage section 43, expands the program in the memory 42, and then sequentially executes processes of the image processing program 250.

The image processing program 250 includes an acquisition process 51, a vehicle movement amount calculation process 52, a solid object mask image generation process 53, a past image set management process 54, a projection plane polygon data creation process 255 and a viewpoint position determination process 56. The image processing program 250 also includes an image synthesis process 257 and a texture image infill process 58. The CPU 41 operates as the texture image infilling section 27 illustrated in FIG. 27 by executing the texture image infill process 58. The CPU 41 also operates as the projection plane polygon data creation section 224 illustrated in FIG. 27 by executing the projection plane polygon data creation process 255. The CPU 41 operates as the image synthesis section 226 illustrated in FIG. 27 by executing the image synthesis process 257. Other processes and storage regions are similar to those of the image processing program 50 according to the first exemplary embodiment. The computer 240 executing the image processing program 250 accordingly functions as the image processing apparatus 210.

Note that it is possible to implement the image processing apparatus 210 by for example a semiconductor integrated circuit, and more precisely by for example an ASIC.

Explanation next follows regarding operation of the second exemplary embodiment. Image management processing as illustrated in FIG. 22 is started in the image processing apparatus 210 when the image processing apparatus 210 is started up. Moreover, in the image processing apparatus 210, all-round image display processing as illustrated in FIG. 29 is executed in parallel to the image management processing. Since the image management processing is similar to that in the first exemplary embodiment, explanation follows regarding the all-round image display processing. Note that parts of the processing in the all-round image display processing of the second exemplary embodiment that are similar to those of the all-round image display processing of the first exemplary embodiment are allocated the same reference numerals and detailed explanation thereof is omitted.

At step 100 of the all-round image display processing (FIG. 29), the acquisition section 20 acquires the sensor values detected by the steering angle sensor 15, the brake sensor 16 and the direction indicator lamp sensor 17 and outputs these to the viewpoint position determination section 25.

Next at step 102, the viewpoint position determination section 25 determines whether or not it is a timing for displaying an all-round image, based on each of the sensor values acquired at step 100. Processing proceeds to step 200 when it is a timing for displaying an all-round image, and processing returns to step 100 when it is not a timing for displaying the all-round image.

Next at step 200, the texture image infilling section 27 acquires a movement amount in an interval $\Delta T_B$ associated with the past image set stored in the past image set storage section 33B. The texture image infilling section 27 then defines the 4×4 coordinate conversion matrix $M_{\Delta T}$ expressed in Equation (1) using the acquired movement amount in interval $\Delta T_B$. The texture image infilling section 27 also computes the position of the cameras 11 at time (T-ΔT) as expressed in the vehicle coordinate system at current time T using the inverse matrix $M_{\Delta T}^{-1}$ of the matrix $M_{\Delta T}$.

Next at step 202, with reference to the solid object mask image stored in the solid object mask image storage section 32, the texture image infilling section 27 derives pixels $Q_{F(T)}$ in the local image coordinate system corresponding to missing portions in the texture image at current time T. The texture image infilling section 27 also computes incident light vectors $I_F$ in the vehicle coordinate system corresponding to the pixels $Q_{F(T)}$ and identifies respective points $C_F$ on the virtual viewpoint projection plane 7. The texture image infilling section 27 then derives pixels $Q_{F(T-\Delta T)}$ in the texture image at time (T–ΔT) corresponding to the points $C_F$ using the position of the respective camera 11 at time (T–ΔT) expressed in the vehicle coordinate system at current time T derived at step 200. The texture image infilling section 27 then writes the pixel values $P_{F(T-\Delta T)}$ of the pixels $Q_{F(T-\Delta T)}$ in the texture image at time (T–ΔT) as the pixel values of the pixels $Q_{F(T)}$ in the texture image at current time T. The missing portions on the texture image at current time T are thereby in-filled.

Next, at step 104, the viewpoint position determination section 25 determines the viewpoint position, and at step 106, the projection plane polygon data creation section 24 creates projection plane polygon data at current time T.

Next at step 204, based on the projection plane polygon data at current time T created at step 106, the image synthesis section 226 then synthesizes an all-round image by mapping the texture image at current time T that has been in-filled at step 202 onto the synthesized image.

Next at step 116, the image synthesis section 226 overlay renders solid object shapes based on 3D position data and a vehicle shape onto the synthesized image, then at step 120 the image synthesis section 226 displays the all-round image on the image display section 18, with processing then returning to step 100.

As explained above, according to the image processing apparatus 210 of the second exemplary embodiment, pixel value missing portions arising from the presence of solid objects in the texture image at current time T are in-filled using the texture image at past time (T–ΔT). Thus, similarly to in the first exemplary embodiment, a natural synthesized image in which pixel value missing portions arising from the presence of solid objects have been eliminated can be created, without creating projection plane polygon data at the past time (T–ΔT) separate to the projection plane polygon data at current time T.

Note that in each of the above exemplary embodiments explanation has been given of cases in which 4 cameras and 4 range sensors that are mounted at the front, back, left and right of a vehicle are employed to synthesize a 360° all-round image of the vehicle's surroundings, however there is no limitation thereto. Configuration may be made using 3 or less cameras and range sensors, or 5 or more cameras and range sensors. For example, configuration may be made using a single camera with one or more than one range sensor. Moreover, the image to be synthesized is not limited to an all-round image, and configuration may be made so as to synthesize an image with a specific range as the target image.

Moreover, although explanation has been given in each of the above exemplary embodiments of cases in which range sensors that are distance sensors are employed to acquire 3D positions for each point on a solid object a vehicle's surroundings, stereoscopic cameras or the like may be employed therefor.

Moreover, although explanation has been given in each of the above exemplary embodiments of cases in which only the texture image of 1 time-slot of time (T–ΔT) is employed as the texture image at a past time for use in in-filling the missing portions, configuration may be made such that plural time-slots of past time texture images are employed. In such cases, configuration may be made in the first exemplary embodiment such that plural sets of infill-use projection plane polygon data corresponding to plural past time-slots are created, and the pixel values of texture images of the corresponding past time-slots are written to pixels of missing portions based on each of the sets of infill-use projection plane polygon data. Moreover, configuration may be made in the second exemplary embodiment such that the texture image infilling section repeatedly performs in-filling of a texture image for plural past time-slots. The proportion of missing portions in-filled is thereby raised, enabling an even more natural synthesized image to be created.

Moreover, explanation has been given in each of the above exemplary embodiments of cases in which a texture image at a past time is employed to infill missing portions of a synthesized image or a texture image at the current time. However, the technology disclosed herein may be applied to cases in which missing portions in a synthesized image or a texture image at a past time are in-filled using a texture image at the current time. Such an approach enables back-tracking to in-fill missing portions of already stored synthesized images at past times in situations in which the objective is to store synthesized images.

Moreover, although explanation has been given in each of the above exemplary embodiments of cases in which the image processing apparatus of technology disclosed herein is installed to a vehicle, installation may be made to a moving body other than a vehicle (such as for example a robot). Moreover, data detected by camera(s), range sensor (s), and other types of sensor that are installed to a moving body may be acquired through communication by the image processing apparatus of technology disclosed herein when located at a position other than that of the moving body.

Moreover, embodiments are explained above in which the image processing program 50, 250 serving as examples of image processing programs of technology disclosed herein are pre-stored (installed) on the storage section 43. However, it is possible to provide the image processing program of technology disclosed herein stored on a storage medium such as a CD-ROM or DVD-ROM.

An aspect of technology disclosed herein exhibits the advantageous effect of enabling a natural synthesized image to be created in which pixel value missing portions arising from the presence of solid objects have been eliminated.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing apparatus, comprising:
   a processor; and
   a memory storing instructions, which, when executed by the processor, perform a procedure, the procedure including:
   (a) acquiring image data representing successively captured images of a moving body's surroundings, and acquiring three dimensional position data representing three dimensional positions of a plurality of points on a solid object present in the moving body's surroundings as expressed in a moving body coordinate system set for the moving body;

(b) calculating a movement amount that the moving body has moved during an interval from a first time to a second time;

(c) identifying pixels representing a solid object in a first image captured at the first time based on the three dimensional position data acquired by (a);

(d) creating, by virtual viewpoint projection, a first correspondence relationship indicating correspondence between each point on a three dimensional projection plane determined so as to contain the moving body therein at the first time and positions of each pixel of the first image, and, based on the movement amount calculated by (b), creating a second correspondence relationship indicating correspondence between each point on the three dimensional projection plane and positions of each pixel in a second image captured at the second time by expressing the position of the moving body at the second time in the moving body coordinate system at the first time, employing a virtual viewpoint projection that projects a captured image onto a virtual viewpoint projection plane that has a shape configured by a combination of a hemisphere of infinite radius with the position of the moving body as its origin, and a horizontal plane in which the moving body is present, and the virtual viewpoint projection re-projects points projected onto the virtual viewpoint projection plane onto the three dimensional projection plane with reference to a virtual viewpoint position; and (e) synthesizing a synthesized image by
taking pixel values of pixels in a synthesized image corresponding to each point on the three dimensional projection plane as viewed from a specific viewpoint position, as pixel values of corresponding pixels of the first image based on the first correspondence relationship, and
taking pixel values of each pixel in the synthesized image corresponding to pixels identified by (c) in the first image as being pixels representing a solid object, as pixel values of corresponding pixels of the second image based on the second correspondence relationship.

2. The image processing apparatus of claim 1, further comprising:

(f) managing the second image based on the movement amount that the moving body has moved during the interval between the first time and the second time as calculated by (b) such that a difference between a position of the moving body at the first time and a position of the moving body at the second time is within a predetermined specific range.

3. The image processing apparatus of claim 1, wherein (c) results in generating a solid object mask image that identifies pixels in the first image that represent a solid object.

4. The image processing apparatus of claim 1, wherein (e) includes synthesizing, onto the synthesized image, a solid object based on the three dimensional position data acquired by (a) and a pre-recorded shape of the moving body.

5. An image processing method to be executed by a processor, comprising:

(a) acquiring image data representing successively captured images of a moving body's surroundings, and acquiring three dimensional position data representing three dimensional positions of a plurality of points on a solid object present in the moving body's surroundings as expressed in a moving body coordinate system set for the moving body;

(b) calculating a movement amount that the moving body has moved during an interval from a first time to a second time;

(c) identifying pixels representing a solid object in a first image captured at the first time based on the three dimensional position data acquired by (a);

(d) creating, by virtual viewpoint projection, a first correspondence relationship indicating correspondence between each point on a three dimensional projection plane determined so as to contain the moving body therein at the first time and positions of each pixel of the first image, and, based on the movement amount calculated by (b), creating a second correspondence relationship indicating correspondence between each point on the three dimensional projection plane and positions of each pixel in a second image captured at the second time by expressing the position of the moving body at the second time in the moving body coordinate system at the first time, employing a virtual viewpoint projection that projects a captured image onto a virtual viewpoint projection plane that has a shape configured by a combination of a hemisphere of infinite radius with the position of the moving body as its origin, and a horizontal plane in which the moving body is present, and the virtual viewpoint projection re-projects points projected onto the virtual viewpoint projection plane onto the three dimensional projection plane with reference to a virtual viewpoint position; and (e) synthesizing a synthesized image by
taking pixel values of pixels on a synthesized image corresponding to each point on the three dimensional projection plane as viewed from a specific viewpoint position, as pixel values of corresponding pixels of the first image based on the first correspondence relationship, and
taking pixel values of each pixel on the synthesized image corresponding to pixels identified by (c) in the first image as being pixels representing a solid object, as pixel values of corresponding pixels of the second image based on the second correspondence relationship.

6. The image processing method to be executed by a processor of claim 5, further comprising:

(f) managing the second image based on the movement amount that the moving body has moved in the interval between the first time and the second time, as calculated by (b), such that a difference between a position of the moving body at the first time and a position of the moving body at the second time is within a predetermined specific range.

7. The image processing method to be executed by a processor of claim 5, wherein (c) results in generating a solid object mask image that identifies pixels in the first image that represent a solid object.

8. The image processing method to be executed by a processor of claim 5, wherein (e) includes synthesizing, onto the synthesized image, a solid object based on the three dimensional position data acquired by (a) and a pre-recorded shape of the moving body.

9. A non-transitory computer-readable recording medium having stored therein a program for causing a computer to execute an image processing process comprising:
- (a) acquiring image data representing successively captured images of a moving body's surroundings, and acquiring three dimensional position data representing three dimensional positions of a plurality of points on a solid object present in the moving body's surroundings as expressed in a moving body coordinate system set for the moving body;
- (b) calculating a movement amount that the moving body has moved during an interval from a first time to a second time;
- (c) identifying pixels representing a solid object in a first image captured at the first time based on the three dimensional position data acquired by (a);
- (d) creating, by virtual viewpoint projection, a first correspondence relationship indicating correspondence between each point on a three dimensional projection plane determined so as to contain the moving body therein at the first time and positions of each pixel of the first image, and, based on the movement amount calculated by (b), creating a second correspondence relationship indicating correspondence between each point on the three dimensional projection plane and positions of each pixel in a second image captured at the second time by expressing the position of the moving body at the second time in the moving body coordinate system at the first time, employing a virtual viewpoint projection that projects a captured image onto a virtual viewpoint projection plane that has a shape configured by a combination of a hemisphere of infinite radius with the position of the moving body as its origin, and a horizontal plane in which the moving body is present, and the virtual viewpoint projection re-projects points projected onto the virtual viewpoint projection plane onto the three dimensional projection plane with reference to a virtual viewpoint position; and
- (e) synthesizing a synthesized image by
  taking pixel values of each pixel on a synthesized image corresponding to each point on the three dimensional projection plane as viewed from a specific viewpoint position, as pixel values of corresponding pixels of the first image based on the first correspondence relationship, and
  taking pixel values of each pixel on the synthesized image corresponding to pixels identified by (c) in the first image as being pixels representing a solid object, as pixel values of corresponding pixels of the second image based on the second correspondence relationship.

10. The non-transitory computer-readable recording medium of claim 9 wherein the process further comprises:
- (f) managing the second image based on the movement amount that the moving body has moved in the interval between the first time and the second time as calculated by (b) such that a difference between a position of the moving body at the first time and a position of the moving body at the second time is within a predetermined specific range.

11. The non-transitory computer-readable recording medium of claim 9 wherein (c) results in generating a solid object mask image that identifies pixels in the first image that represent a solid object.

12. The non-transitory computer-readable recording medium of claim 9 wherein (e) includes synthesizing, onto the synthesized image, a solid object based on the three dimensional position data acquired by (a) and a pre-recorded shape of the moving body.

* * * * *